US012715789B2

(12) United States Patent
Muppidi et al.

(10) Patent No.: US 12,715,789 B2
(45) Date of Patent: Aug. 25, 2026

(54) AUTONOMOUS WATER VEHICLE FOR COLLECTING WASTE AND ALGAE FROM WATER BODIES AND METHOD OF OPERATION

(71) Applicants: Preetam Sai Muppidi, San Ramon, CA (US); Madhumati Pattabhi, Kingsville, TX (US)

(72) Inventors: Preetam Sai Muppidi, San Ramon, CA (US); Madhumati Pattabhi, Kingsville, TX (US); Sudhakar Rao Krothapalli, Rancho Palos Verdes, CA (US)

( * ) Notice: Subject to any disclaimer, the term of this patent is extended or adjusted under 35 U.S.C. 154(b) by 0 days.

(21) Appl. No.: 19/411,412

(22) Filed: Dec. 8, 2025

(65) Prior Publication Data

US 2026/0091994 A1 Apr. 2, 2026

Related U.S. Application Data

(60) Provisional application No. 63/769,799, filed on Mar. 11, 2025.

(51) Int. Cl.
*C02F 1/40* (2023.01)
*C02F 103/00* (2006.01)
(Continued)

(52) U.S. Cl.
CPC .............. *C02F 1/40* (2013.01); *G05D 1/243* (2024.01); *G05D 1/622* (2024.01);
(Continued)

(58) Field of Classification Search
None
See application file for complete search history.

(56) References Cited

U.S. PATENT DOCUMENTS 3,968,041 A * 7/1976 De Voss ................. B65G 51/01 210/776
7,101,475 B1 * 9/2006 Maaske ................. E04H 4/1263 210/167.2

(Continued)

OTHER PUBLICATIONS

"Machine Translation of CN114960577A", Zuo et al., CN114960577A, published 2022, 62 total pages. (Year: 2022).*

(Continued)

*Primary Examiner* — Jonathan M Peo
(74) *Attorney, Agent, or Firm* — Novel Patent Services LLC

(57) ABSTRACT

The present invention relates to an autonomous water vehicle for collecting and separating waste from aquatic environments, thereby enabling the efficient extraction of algae from water bodies. The autonomous water vehicle comprises a floating body, a driving unit, a conveyor unit, a scraping assembly, a first capturing unit, a second capturing unit, and a control unit. The autonomous water vehicle reduces operational costs while being adaptable for lakes, rivers, and small water bodies, making it ideal for environmental clean-up projects. The autonomous water vehicle is continuously monitored by a user, thereby improving efficiency and convenience. The autonomous water vehicle utilizes capturing units and GPS tracker for enabling precise navigation, real-time detection of floating waste, and obstacle avoidance. This integration ensures efficient route optimization for enhanced cleaning performance.

15 Claims, 14 Drawing Sheets

(51) Int. Cl.
*G05D 1/243* (2024.01)
*G05D 1/622* (2024.01)
*G05D 109/30* (2024.01)

(52) U.S. Cl.
CPC .. *C02F 2103/007* (2013.01); *C02F 2201/008* (2013.01); *G05D 2109/34* (2024.01)

(56) References Cited

U.S. PATENT DOCUMENTS

| | | | | |
|---|---|---|---|---|
| 2012/0055856 | A1* | 3/2012 | Ratti | C02F 1/008 977/762 |
| 2015/0076080 | A1* | 3/2015 | Becker | E21B 43/0122 210/96.1 |
| 2019/0367387 | A1* | 12/2019 | Gwon | B63J 3/04 |
| 2024/0034442 | A1* | 2/2024 | Covington | E02B 15/046 |
| 2024/0117582 | A1* | 4/2024 | Ji | E02B 15/048 |

OTHER PUBLICATIONS

"Machine Translation of CN111943381A", Xiao, CN111943381A, published 2020, 37 total pages. (Year: 2020).*

* cited by examiner

AUTONOMOUS WATER VEHICLE FOR COLLECTING WASTE AND ALGAE FROM WATER BODIES AND METHOD OF OPERATION

FIELD OF THE INVENTION

The present invention relates to the field of water treatment, aquatic waste management systems, and specifically, relates to an autonomous water vehicle with an anti-clogging mechanism that collects and separates waste materials include recyclable materials and organic waste from aquatic environments, and automatically performs a scrapping operation, thereby improving efficiency while reducing power consumption.

BACKGROUND

Water bodies such as lakes, rivers, ponds, and small reservoirs are increasingly vulnerable to pollution arising from both submerged and floating waste. Typical contaminants include algae, plastic bags, paper, packaging materials, and other debris. The accumulation of such pollutants creates significant environmental and ecological challenges. Excessive algal growth can obstruct sunlight penetration, reduce dissolved oxygen levels, and destabilize aquatic ecosystems, while floating plastics and debris disrupt habitats, entangle aquatic organisms, and release harmful chemical compounds. Beyond ecological disruption, these pollutants degrade the aesthetic and recreational value of water bodies and pose direct risks to public health.

The removal of floating waste is conventionally performed using manual tools such as nets, mesh bags, and handheld skimmers. Although simple and widely accessible, these methods are labor-intensive, time-consuming, and poorly suited for large-scale or persistent pollution events. Manual collection further struggles to manage the diverse nature of floating waste, which ranges from lightweight plastic fragments to slippery, cohesive algae masses. Limited scalability, inconsistent collection rates, and the physical demands on operators significantly reduce the effectiveness of manual cleanup efforts.

In certain cases, chemical treatments are employed to control excessive algal growth or to break down organic waste. While such treatments may yield short-term reductions in algal biomass, they introduce substantial environmental hazards. Many chemical agents are toxic to aquatic flora and fauna, disrupt ecological balance, and may persist as harmful residues in the water. Long-term exposure to these chemicals can result in chronic contamination, diminished water quality, and adverse health effects for humans and animals that interact with or consume the affected water.

Mechanical devices have been developed to automate the process of collecting floating waste from aquatic environments. These devices typically employ a floating platform equipped with motorized propulsion and a conveyor-based collection mechanism that transfers waste into an onboard storage compartment. Despite improvements in automation, these systems frequently encounter operational inefficiencies due to waste adhesion on the conveyor belt. Sticky or fibrous materials especially algae tend to accumulate on the belt surface, obstructing smooth transfer into the storage unit and necessitating manual removal.

Algae presents a unique challenge because of its slimy texture, high moisture content, and low structural rigidity. These characteristics cause algae to cling to conveyor surfaces, reducing collection efficiency and requiring operators to engage in frequent maintenance. Manual removal of adhered algae interrupts the cleaning process, increases the time and labor required, and undermines the purpose of adopting automated solutions. Persistent algae buildup can also cause clogging or stalling of the conveyor mechanism, further compromising the device's functionality.

One known approach to mitigate algae adhesion involves applying anti-sticking materials or coatings to conveyor belts. However, such coatings degrade over time due to abrasion and environmental exposure, reducing their long-term effectiveness. Additionally, certain coatings may compromise belt traction, causing waste to slip during collection. Some chemical coatings raise environmental concerns by leaching harmful substances or contributing microplastic particles to the water, thereby exacerbating the pollution they aim to address.

Maintaining these coatings typically requires frequent reapplication, increasing operational complexity and cost. Even when coatings are intact, excessive algae accumulation can still cause clogging, requiring auxiliary scraping or cleaning mechanisms. After floating waste is collected, effective downstream processing requires the sorting of recyclable materials such as plastics and paper from organic waste like algae, which may be repurposed into biofuel, fertilizer, or animal feed. Manual sorting, however, remains labor-intensive, slow, and insufficient for large-scale operations.

Traditional chemical-based algae removal systems exacerbate environmental risks by introducing toxic substances into water bodies and failing to discriminate between harmful algal blooms and beneficial microorganisms. Meanwhile, bulky mechanical waste collectors often require direct human operation, are expensive to deploy, and lack precision, resulting in inefficient or indiscriminate collection. Furthermore, repeated chemical treatments can alter water pH, increase toxicity, and require multiple applications, compounding their environmental footprint.

Prior arts such as CN114960577A and CN217629773U disclose autonomous or semi-autonomous floating waste collection devices capable of recovering debris from water surfaces. However, these references do not satisfactorily address algae adhesion issues on conveyor-based collection systems, nor do they include integrated anti-clogging or algae-detachment mechanisms. Existing systems described in these references primarily focus on surface debris removal and lack onboard automated sorting capabilities to separate recyclable materials from organic waste. Consequently, manual intervention is routinely required when slimy waste accumulates, limiting efficiency and continuity of operation.

Therefore, there is a need for an autonomous water vehicle that collects and separates waste materials include recyclable materials and organic waste from aquatic environments, and automatically performs a scrapping operation, thereby improving efficiency while reducing power consumption. There is also a need for an autonomous water vehicle with a reliable anti-clogging mechanism that prevents the organic waste, for example, algae from adhering to a conveyor and ensures uninterrupted transfer of the waste materials into storage compartments. There is also a need for an autonomous water vehicle equipped with an integrated sorting system capable of separating the waste materials include recyclable materials such as plastics and paper from organic waste like algae, thereby streamlining downstream recycling and biomass utilization.

There is also a need for an autonomous water vehicle that reduces or eliminates manual maintenance by incorporating an automated scraper or self-cleaning conveyor architecture that continuously removes adhered waste from the conveyor surface. Further, there is also a need for an autonomous water vehicle that simultaneously addresses algae adhesion, autonomous waste collection, and onboard waste material sorting would significantly improve operational efficiency, minimize labor requirements, reduce environmental risks, and enhance the sustainability of aquatic ecosystem maintenance.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments nor delineate the scope of any or all embodiments.

The present disclosure, in one or more embodiments, relates to an autonomous water vehicle for collecting and separating waste from aquatic environments, thereby enabling the efficient extraction of algae from water bodies. The autonomous water vehicle eliminates the need for frequent manual cleaning, thereby ensuring continuous and efficient operation. Its adaptable design is well-suited for environmental clean-up projects in lakes, rivers, and small water bodies. By incorporating a streamlined system with fewer motors and components, the autonomous water vehicle minimizes wear and tear, thereby reducing maintenance costs by 50% compared to conventional models.

In one embodiment herein, the autonomous water vehicle comprises a floating body, a driving unit, a conveyor unit, a scraping assembly, a first capturing unit, a second capturing unit, and a control unit.

In one embodiment herein, the floating body is configured to provide buoyancy, stability, and structural support on a water surface. The floating body is adapted to operably support a plurality of propulsion wheels configured to generate directional translational movement of the autonomous water vehicle across the water surface. In one embodiment herein, the driving unit is movably mounted on a support member affixed to the floating body. The driving unit is configured to operably connect to an actuator through an extendable shaft. The driving unit is configured to be activated to rotate a drive gear. The actuator is configured to extend or retract the extendable shaft to linearly translate the driving unit along the support member.

In one embodiment herein, the conveyor unit is inclinedly mounted on a plurality of support rollers. The conveyor unit is configured to collect and elevate floating waste from the water surface upon actuation while the autonomous water vehicle maneuvers across the water surface. The plurality of support rollers is rotatably mounted on respective elongated shafts secured to the floating body and to a pair of extended columns.

In one embodiment herein, the scraping assembly is operably positioned on the floating body. The scraping assembly is configured to perform a sorting operation for separating organic waste from the floating waste upon detection during a cleaning process. The scraping assembly comprises a scraping member, and a linear actuation unit.

In one embodiment herein, the scraping member is movably positioned relative to the conveyor unit. In one embodiment herein, the linear actuation unit is mounted on the floating body. The linear actuation unit is operably connected to the scraping member. The linear actuation unit is configured to operably couple to the driving unit through a bevel gear when the driving unit is translated toward the linear actuation unit. The bevel gear is rotatably supported by a supporting shaft and second supporting brackets.

The bevel gear is operably connected to the drive gear. The bevel gear is configured to be rotated to enable the linear actuation unit to drive the scraping member in the linear reciprocating direction across the conveyor unit for performing the sorting operation. In particular, activation of the linear actuation unit drives the scraping member in a linear reciprocating direction across the conveyor unit to push the organic waste from the conveyor unit into a first storage chamber mounted on the floating body, thereby performing the sorting operation.

In one embodiment herein, the first capturing unit is mounted on a support frame affixed to the floating body. The first capturing unit is configured to capture images of the water surface and detect the floating waste on the water surface. The first capturing unit is a 360-degree rotatable artificial intelligence (AI) camera. In one embodiment herein, the second capturing unit is mounted on the support frame. The second capturing unit is configured to detect the organic waste present on the conveyor belt during the cleaning process. The second capturing unit is an artificial intelligence (AI) camera.

In one embodiment herein, the control unit is operably disposed on the floating body. The control unit is configured to communicate with the driving unit, the plurality of propulsion wheels, and the actuator. The control unit is configured to acquire image data from the first capturing unit and the second capturing unit, respectively. The control unit is configured to process the image data and perform threshold-based classification to identify floating waste characteristics include recyclable waste and organic waste.

The control unit is configured to selectively actuate the driving unit to linearly reposition for operating either the conveyor unit to initiate the cleaning process, or the linear actuation unit to drive the scraping member across the conveyor unit for transferring the organic waste into the first storage chamber. The control unit is further configured to communicate with a user device through a network, thereby enabling remote activation, status retrieval, and real-time monitoring of the cleaning process including waste detection events, conveyor unit activity, the sorting operation, and positional movement of the autonomous water vehicle during the cleaning process.

In one embodiment herein, each of the plurality of propulsion wheels is operatively coupled to a respective drive actuator and configured to impart torque to the corresponding propulsion wheel, thereby maneuvering the autonomous water vehicle across the water surface. In particular, selective variation of a rotational speed and a rotational direction of the plurality of propulsion wheels provides asymmetric thrust distributions, thereby enabling forward propulsion, reverse propulsion, directional turning, and pivot-type maneuvering of the autonomous water vehicle.

In one embodiment herein, the plurality of support rollers comprises a first support roller, and a second support roller. In one embodiment herein, the first support roller is rotatably connected to the drive gear via a gear unit. The first support roller is configured to be rotated upon rotation of the drive gear. The gear unit comprises a compound gear, and a driven gear.

In one embodiment herein, the compound gear is operably connected to the drive gear. The compound gear is configured to rotate in at least one direction upon rotation of the drive gear. The compound gear is a double-surfaced bevel gear. In one embodiment herein, the driven gear is rotatably connected to the first support roller via a first elongated shaft. The driven gear is configured to be rotated upon rotation of the compound gear.

In one embodiment herein, the second support roller is rotatably mounted on the pair of extended columns. The second support roller is configured to be rotated upon rotation of the first support roller via a conveyor belt. The conveyor belt having a plurality of perforations defined across its surface to permit drainage of water while retaining and transporting floating waste collected from the water surface. The plurality of perforations is dimensioned and spatially distributed across the conveyor belt to optimize water discharge and reduce load on the conveyor unit.

In one embodiment herein, the autonomous water vehicle further comprises a second storage chamber that is disposed on the floating body. The second storage chamber is configured to receive the recyclable waste. The conveyor belt is controllably operated to transport and discharge segregated recyclable waste into the second storage chamber during the cleaning operation. The conveyor belt is made of a corrosion-resistant mesh material to prevent clogging while allowing efficient water drainage.

In one embodiment herein, the autonomous water vehicle is in communication with the network via an Internet of Things (IoT) communication module. In one embodiment herein, the linear actuation unit comprises a first link member, and a second link member.

In one embodiment herein, the first link member is rotatably connected to the bevel gear via the supporting shaft. In one embodiment herein, the second link member is pivotably connected to the first link member. The second link member is configured to be actuated upon rotation of the first link member, thereby enabling the scraping member to push the organic waste from the conveyor unit into the first storage chamber mounted on the floating body, thereby performing the sorting operation.

In one embodiment herein, the autonomous water vehicle comprises an artificial intelligence (AI) module, a sensing unit, and a global positioning system (GPS) module. In one embodiment herein, the AI module is in communication with the first capturing unit. The AI module is configured to receive the image data from the first capturing unit and process the image data, thereby classifying the processed image data into recyclable and organic categories using AI-based image processing.

In one embodiment herein, the sensing unit is configured to detect obstacles while autonomous water vehicle maneuvering across the water surface and transmit the image data to the control unit for initiating an adjustment to the autonomous water vehicle's path. In one embodiment herein, the GPS module is configured to perform real-time tracking of the autonomous water vehicle and transmit the tracked data to the control unit for autonomous path determination and guidance.

In one embodiment herein, the autonomous water vehicle comprises a first power source, and a second power source. In one embodiment herein, the first power source is configured to supply electrical power to the control unit and the plurality of drive actuators. In one embodiment herein, the second power source is configured to supply electrical power to the driving unit and the actuator. In one embodiment herein, the plurality of support rollers is rotationally driven by the driving unit through the corresponding elongated shaft via the gear unit, thereby imparting rotational support and guided movement of the conveyor unit along a conveying path.

According to an aspect, the invention provides a method for operating the autonomous water vehicle. At one step, the user places the autonomous water vehicle onto the water surface. At one step, the control unit activates the plurality of drive actuators coupled to the plurality of propulsion wheels to initiate navigation of the autonomous water vehicle across the water surface. At one step, the control unit acquires the image data corresponding to detected floating waste from the first capturing unit.

At one step, the AI module detects and classifies the floating waste into recyclable and organic categories using the artificial intelligence (AI)-based image processing of the acquired image data. At one step, the control unit activates the plurality of support rollers via the driving unit operatively coupled to the gear unit to guide the conveyor unit along the defined conveyor path, thereby collecting and elevating the floating waste from the water surface. At one step, the control unit acquires the image data from the second capturing unit and performs the threshold-based classification based on the detected organic waste.

At one step, the control unit activates the actuator to translate the driving unit along the length of the support member via the extendable shaft, thereby initiating the linear actuation unit to drive the scraping member across the conveyor unit for transferring the organic waste into the first storage chamber. At one step, the control unit operates the plurality of drive actuators to regulate speeds of the plurality of propulsion wheels to adjust the navigation of the autonomous water vehicle based on the detected floating waste and the classified organic waste obtained from the first capturing unit and the second capturing unit.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
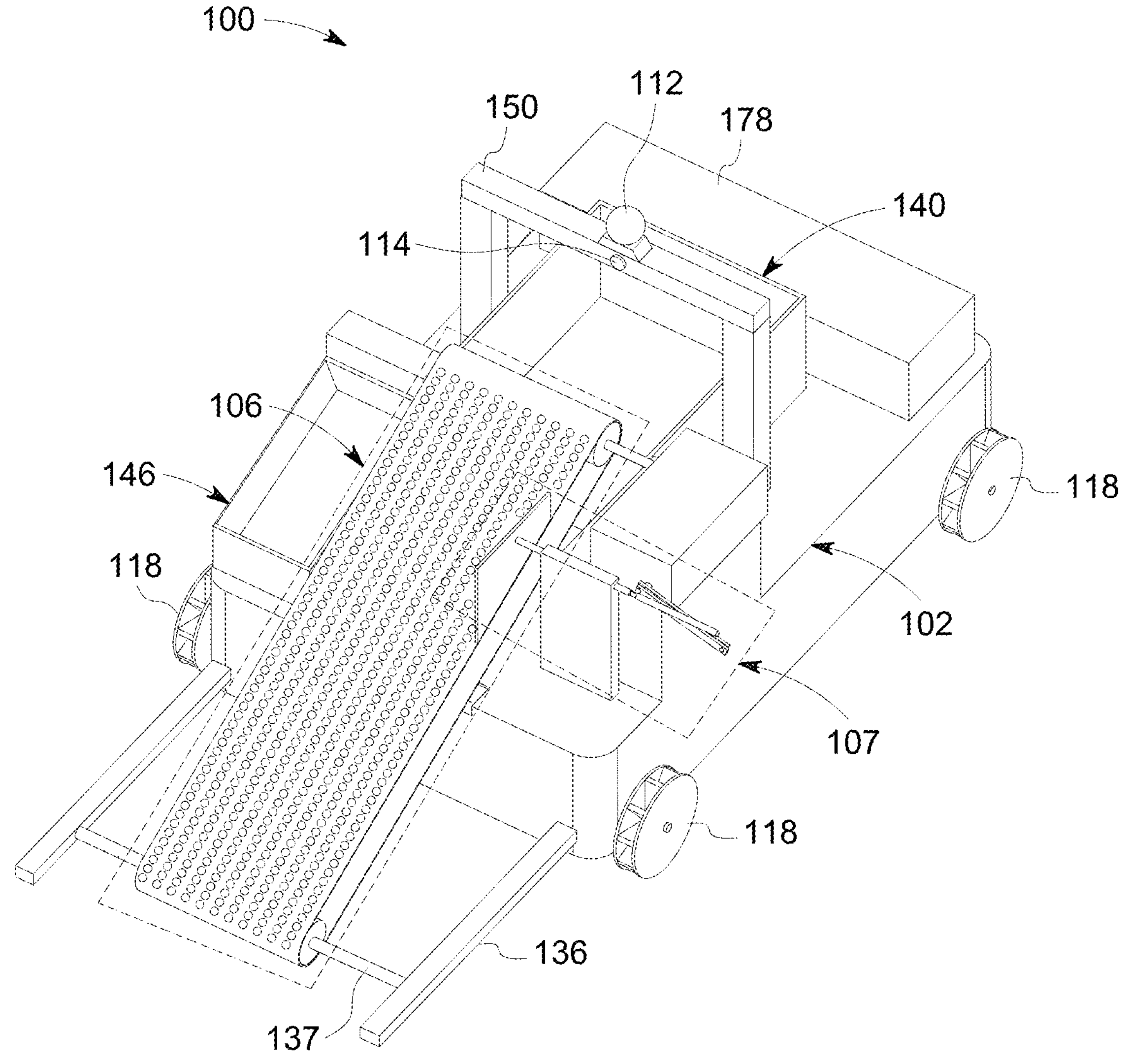
FIG. 1A illustrates an isometric view of an autonomous water vehicle, in accordance with of the invention.

Reference will now be made in detail to the present preferred embodiments of the invention, examples of which are illustrated in the accompanying drawings. Wherever possible, the same reference numerals are used in the drawings and the description to refer to the same or like parts.

Figure 1B:
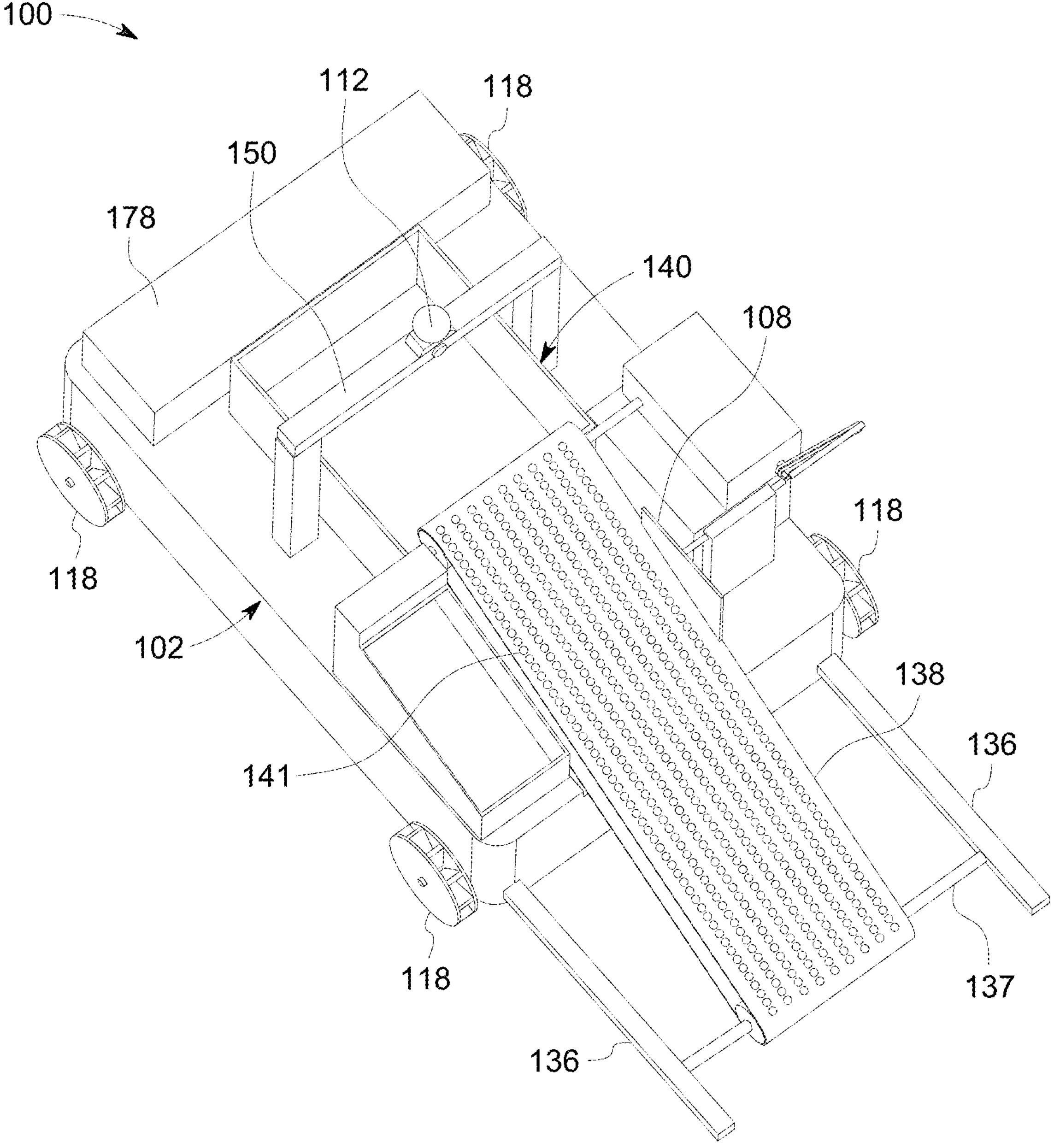
FIG. 1B illustrates an isometric view of the autonomous water vehicle, in accordance with of the invention.
Figure 1C:
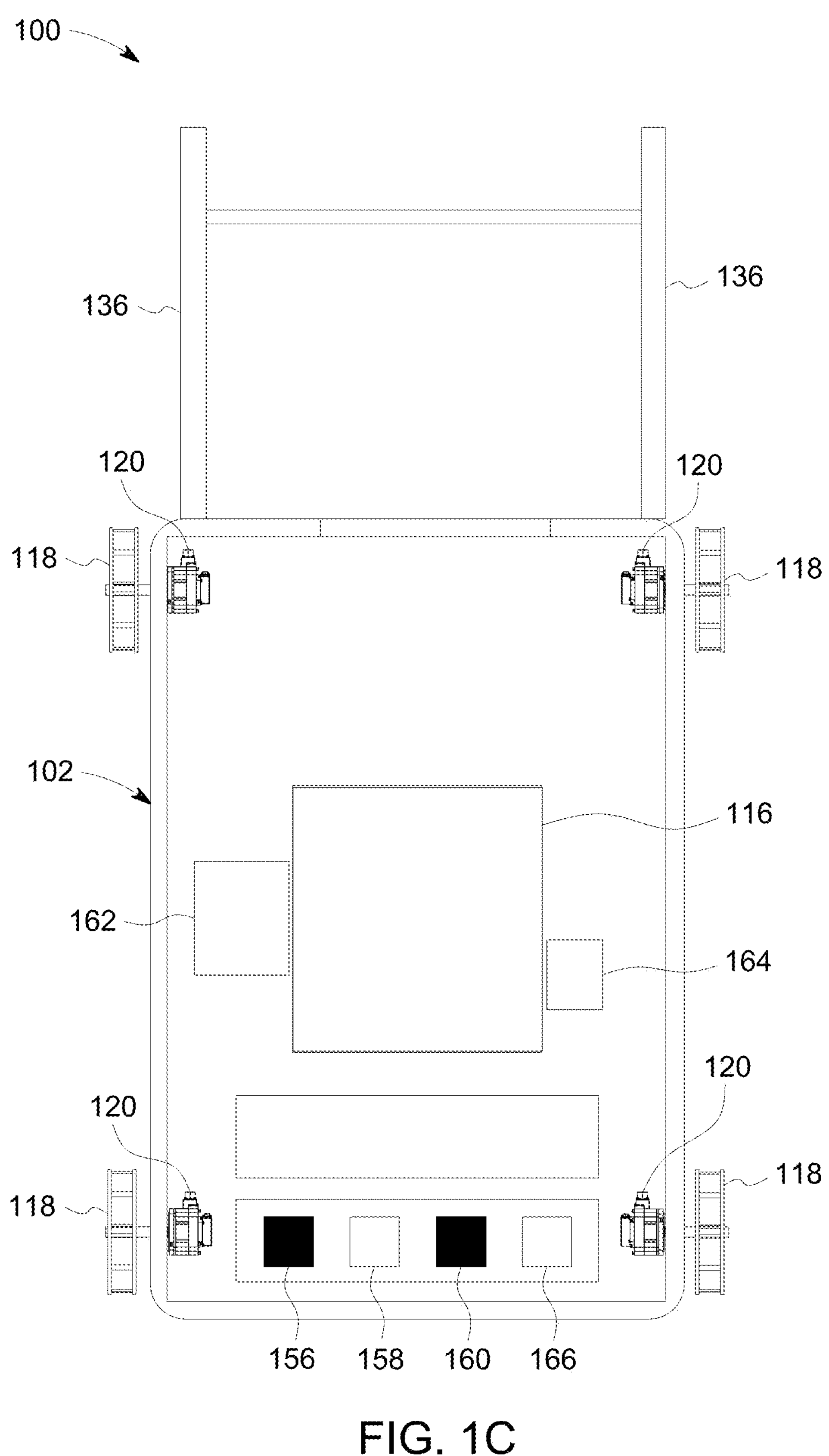
FIG. 1C illustrates a top view of the autonomous water vehicle, in accordance with of the invention.

FIGS. 1A-1B refer to isometric views of an autonomous water vehicle 100. FIG. 1C refers to a top view of the autonomous water vehicle 100. In one embodiment herein, the autonomous water vehicle 100 is configured for collecting and separating waste from aquatic environments, thereby enabling the efficient extraction of algae from water bodies. The autonomous water vehicle 100 reduces operational costs while being adaptable for lakes, rivers, and small water bodies, making it ideal for environmental clean-up projects. The autonomous water vehicle 100 is continuously monitored by a user, thereby improving efficiency and convenience. The autonomous water vehicle 100 utilizes capturing units and GPS tracker for enabling precise navigation, real-time detection of floating waste, and obstacle avoidance. This integration ensures efficient route optimization for enhanced cleaning performance.

Figure 3:
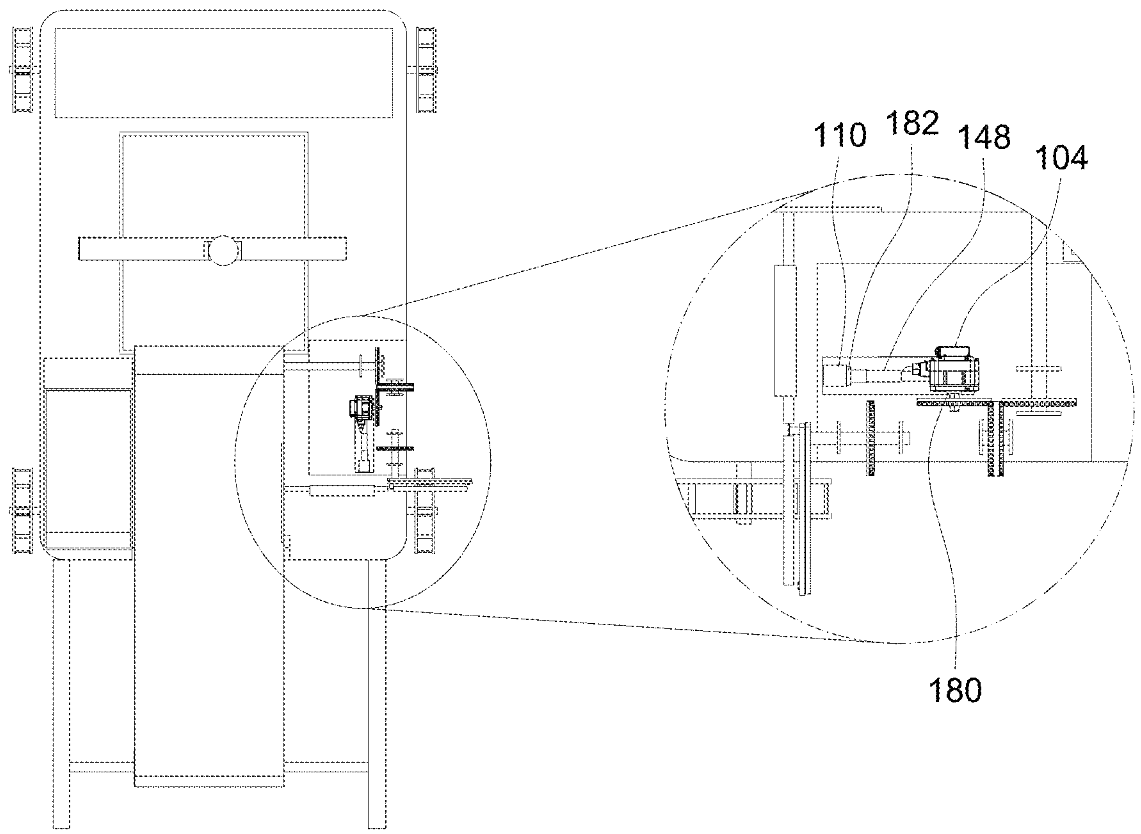
FIG. 3 illustrates a top view of the autonomous water vehicle, in accordance with of the invention.

In one embodiment herein, the autonomous water vehicle 100 comprises a floating body 102, a driving unit 104, a conveyor unit 106, a scraping assembly 107, a first capturing unit 112, a second capturing unit 114, a first encoder 180 (as shown in FIG. 3), a second encoder 182 (as shown in FIG. 3), and a control unit 116.

In one embodiment herein, the floating body 102 having a generally rectangular structural configuration, is configured to provide buoyancy, hydrodynamic stability, and structural support for the autonomous water vehicle 100 during operation on a water surface. The floating body 102 is further adapted to operably support a plurality of propulsion wheels 118, each propulsion wheel 118 being configured to generate directional translational movement of the autonomous water vehicle 100 across the water surface.

In one embodiment herein, each of the plurality of propulsion wheels 118 is operatively coupled to a respective drive actuator 120, the drive actuator 120 being configured to impart torque to the corresponding propulsion wheel 118 to effect propulsion and maneuvering of the autonomous water vehicle 100 (as shown in FIG. 1C). Selective variation of the rotational speed and rotational direction of the plurality of propulsion wheels 118 produces asymmetric thrust distributions, thereby enabling forward propulsion, reverse propulsion, lateral and directional turning maneuvers, and pivot-type rotation of the autonomous water vehicle 100 about its vertical axis. The floating body 102 may be formed of a lightweight, corrosion-resistant material such as high-density polyethylene (HDPE), marine-grade aluminum, or an equivalent buoyant structural material suitable for prolonged exposure to aquatic environments.

TABLE 1

| Parameter | Preferred Specification | Acceptable Range | Notes |
|---|---|---|---|
| Drive actuator type | 24 V BLDC + planetary gearbox (marine-sealed) | 24 V brushed DC + planetary | BLDC = higher efficiency/longer life |
| Continuous power (per motor) | 80-120 W | 60-150 W | Sized for steady cruise with margin |
| Peak power (≤3 s, per motor) | 200-300 W | 150-400 W | For quick turns, weed escape |
| Gear ratio | 20:1-30:1 | 15:1-40:1 | Puts output in 100-160 rpm zone |
| Output speed (post-gear) | 100-160 rpm | 80-200 rpm | For paddle tip speed ≈ 0.8-1.2 m/s (R ≈ 100 mm) |
| Output torque (continuous) | 4-6 Nm. | 3-8 Nm. | Gives usable thrust with slip losses |
| Peak torque (≤3 s) | 10-14 Nm. | 8-18 Nm. | Short surge for maneuvering |
| Supply/current (per motor) | 24 V, 4-6 A cont.; 12-18 A peak | — | Size driver 25-30 A peak |
| Encoder | Incremental 512-1024 CPR (A/B/Z) | 256-2048 CPR | Closed-loop speed/heading hold |
| Brake (optional) | 24 V holding brake ≥1 Nm. | 0.5-2 Nm. | Holds position against wind/current |
| Shaft/mount | Ø10 mm keyed, face-mount 63 mm class | Ø8-12 mm | Stainless shaft & hardware |
| Bearings/seals | Double-sealed bearings, shaft seal + slinger | — | Keep spray out; grease ports if possible |

TABLE 1-continued

| Parameter | Preferred Specification | Acceptable Range | Notes |
|---|---|---|---|
| Protection | IP67-IP68 motor + gear unit | IP65-IP68 | Splash/brief immersion ready |
| Corrosion resistance | Epoxy-coated housing, SS fasteners | — | Fresh/brackish duty |
| Operating temperature | −10° C. to +60° C. | −20° C. to +70° C. | Outdoor range |
| Motor controller | Dual 24 V BLDC FOC, 30 A peak/channel, regen clamp | 20-40 A peak | Current limit + stall detect |
| Cable/connector | Shielded 4-core + M12 (IP67) | — | Keep encoder lines twisted/shielded |

Table 1 represents specifications of the plurality of drive actuators 120 used in the autonomous water vehicle 100.

In one embodiment herein, the driving unit 104 is movably mounted on a support member 122 affixed to the floating body 102, thereby enabling guided translational movement of the driving unit 104 along the support member 122. In particular, the extendable shaft 148 being configured to transmit linear motion generated by the actuator 110. The driving unit 104 is configured to be selectively activated to rotate a drive gear 124 in at least one rotational direction. The actuator 110 is configured to extend or retract the extendable shaft 148, thereby linearly translating the driving unit 104 along the support member 122 to effect positional adjustment during operation. In one embodiment herein, the support member 122 refers to a rigid structure of the floating body 102 configured to support, retain, or align mechanical elements associated with the driving unit 104 and the conveyor unit 106.

Figure 4A:
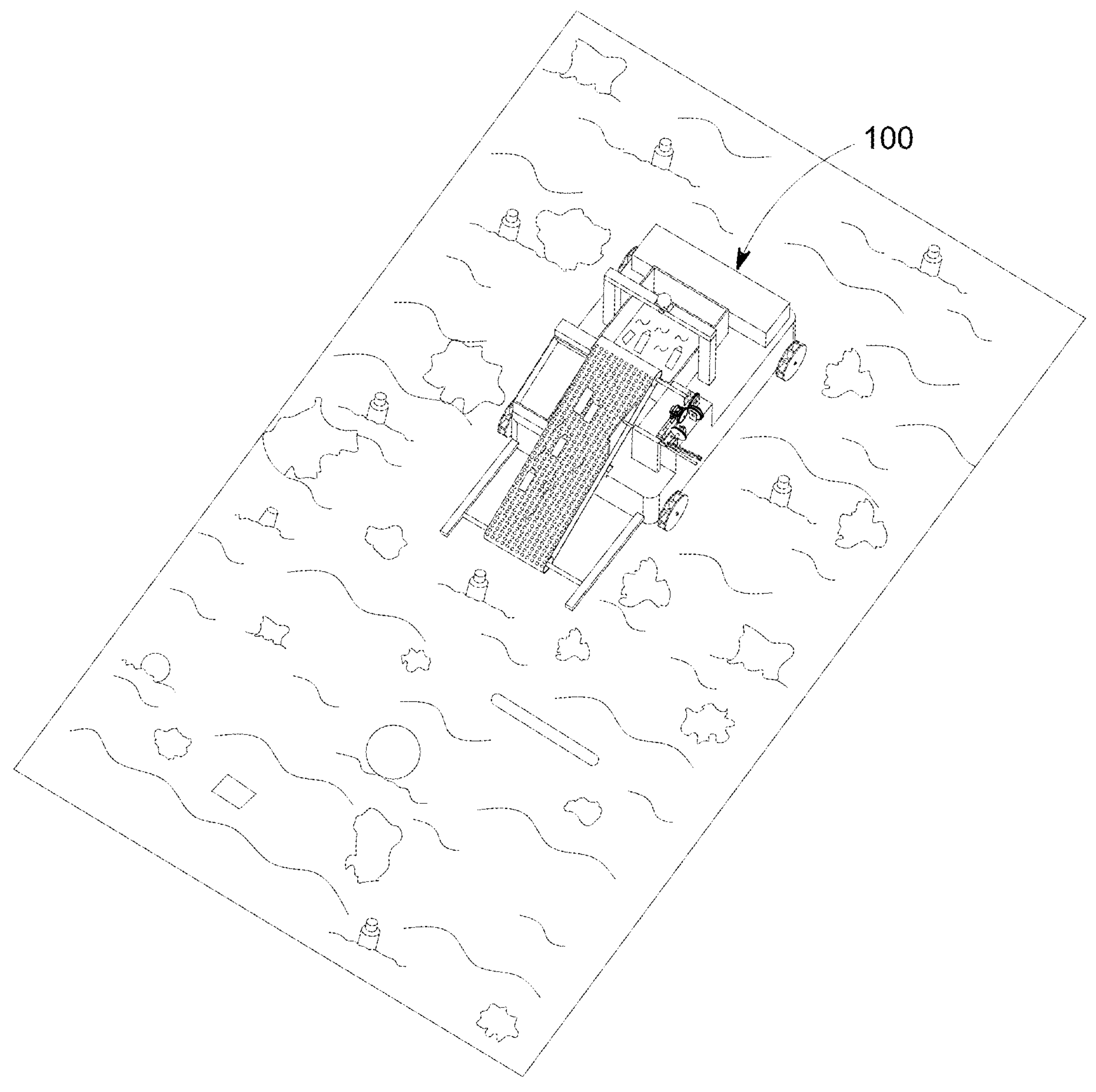
FIG. 4A illustrates an isometric view of the autonomous water vehicle upon placing on water surface, in accordance with of the invention.
Figure 4B:
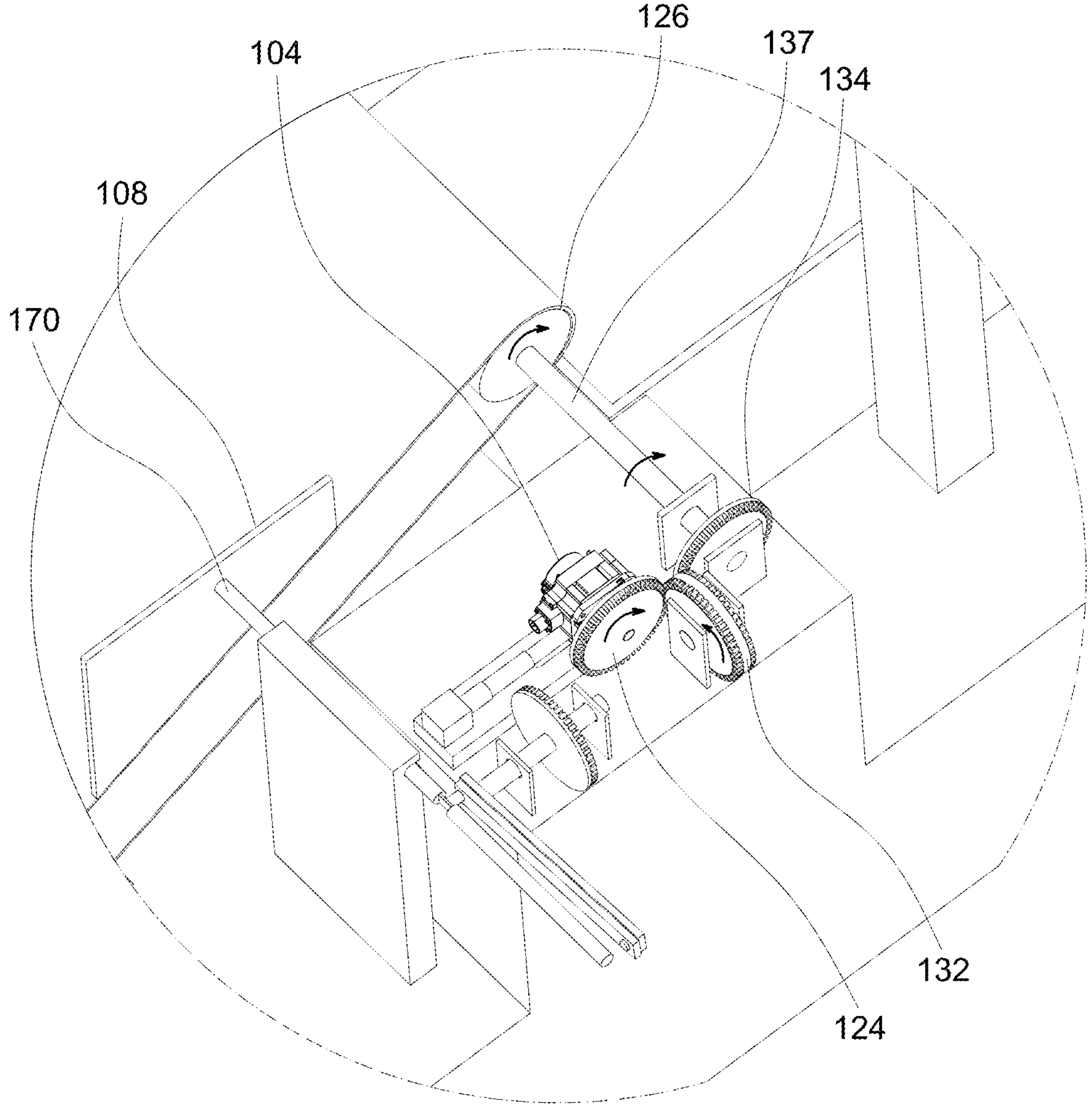
FIG. 4B illustrates an isometric view of the autonomous water vehicle upon activation of a driving unit, in accordance with of the invention.
Figure 4C:
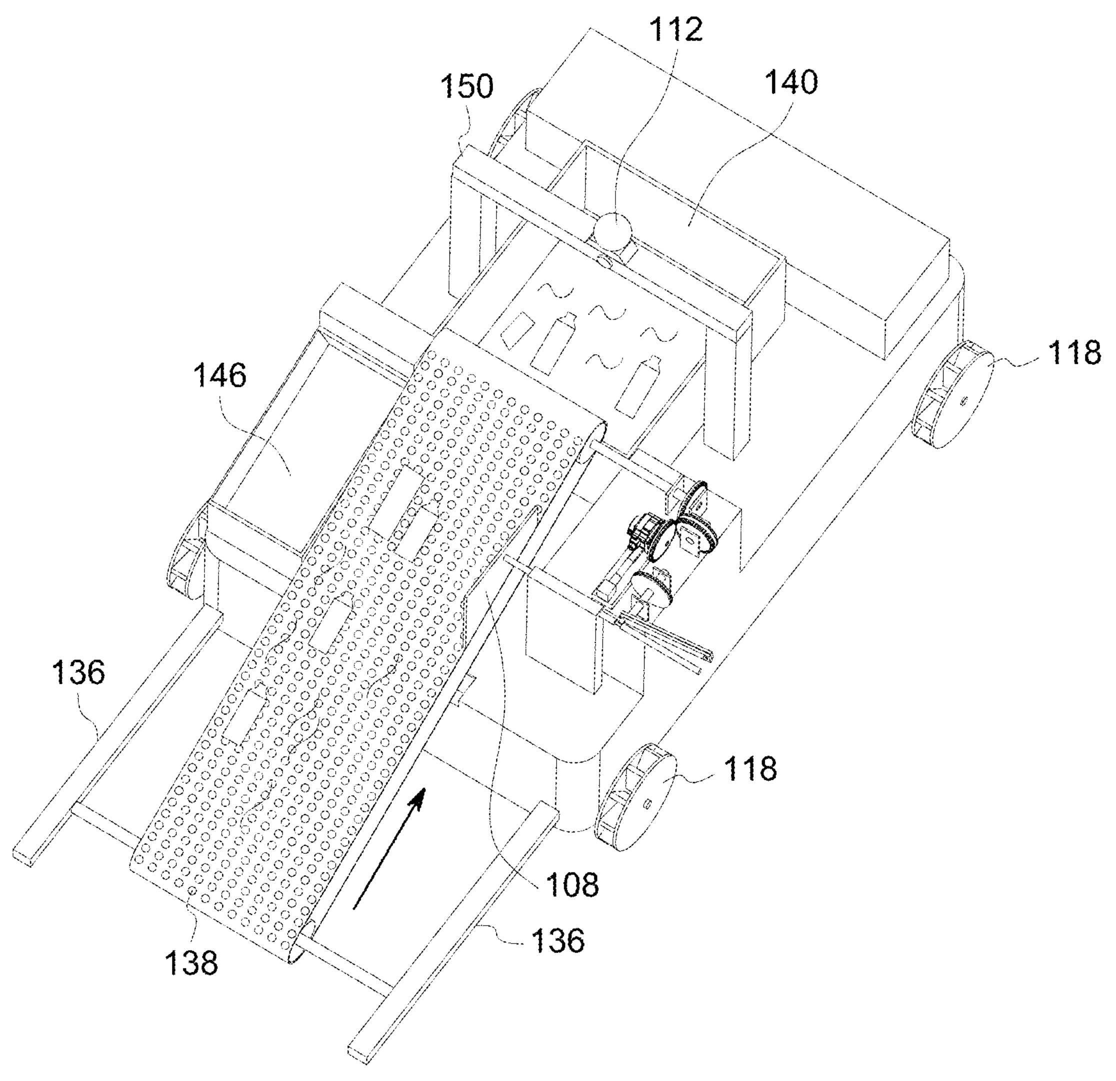
FIG. 4C illustrates an isometric view of the autonomous water vehicle while collecting floating waste, in accordance with of the invention.
Figure 4D:
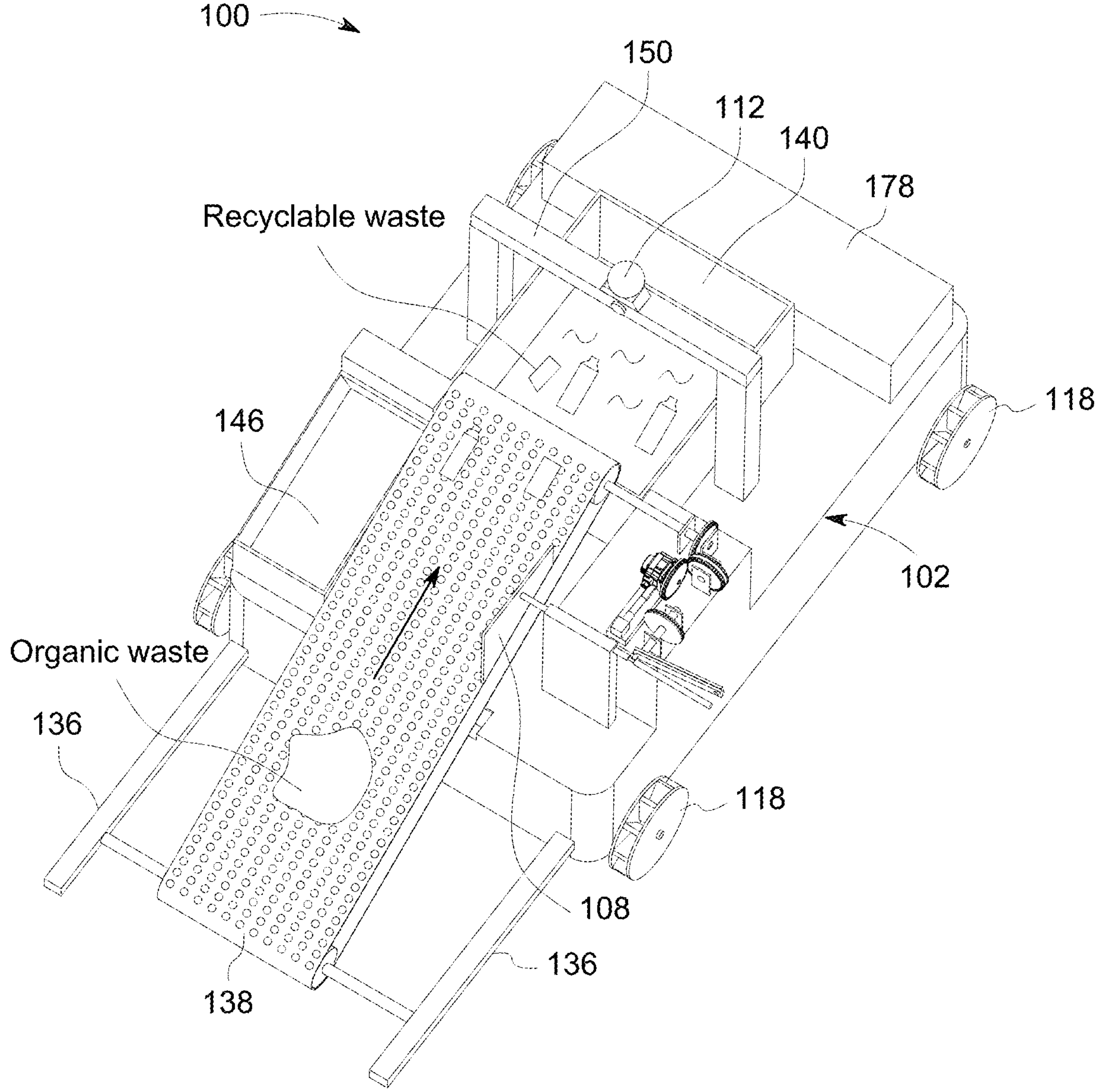
FIG. 4D illustrates an isometric view of the autonomous water vehicle when organic waste is present on a conveyor belt, in accordance with of the invention.
Figure 4E:
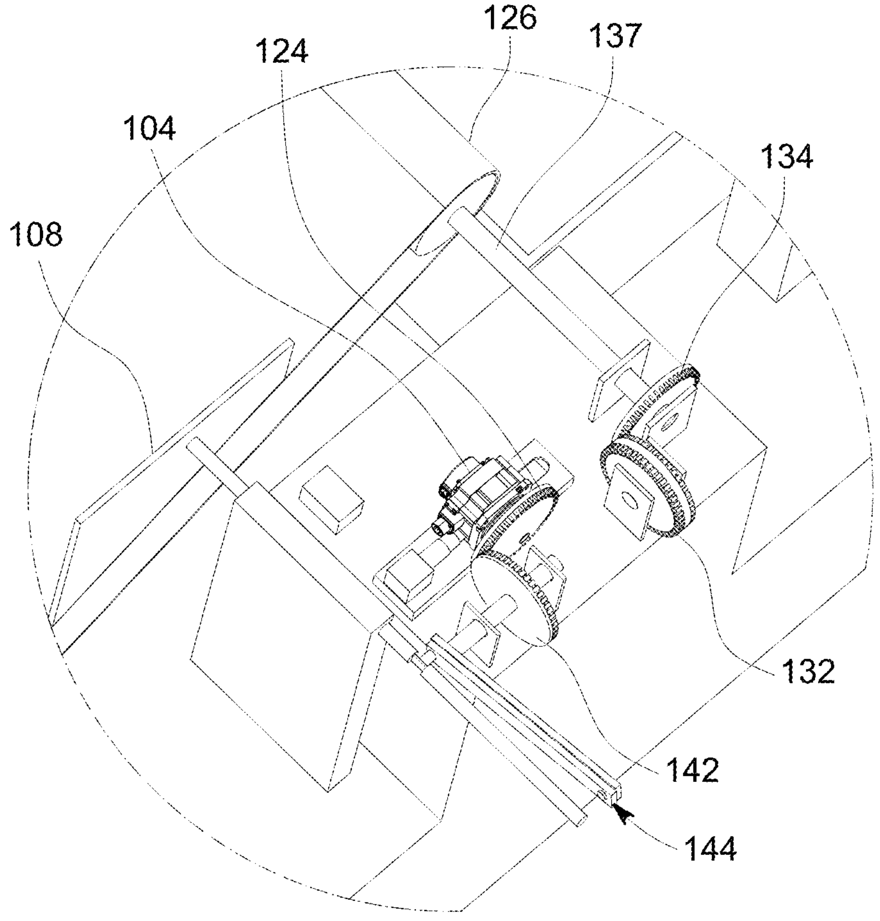
FIG. 4E illustrates an isometric view of the autonomous water vehicle upon activation of an actuator, in accordance with of the invention.
Figure 4F:
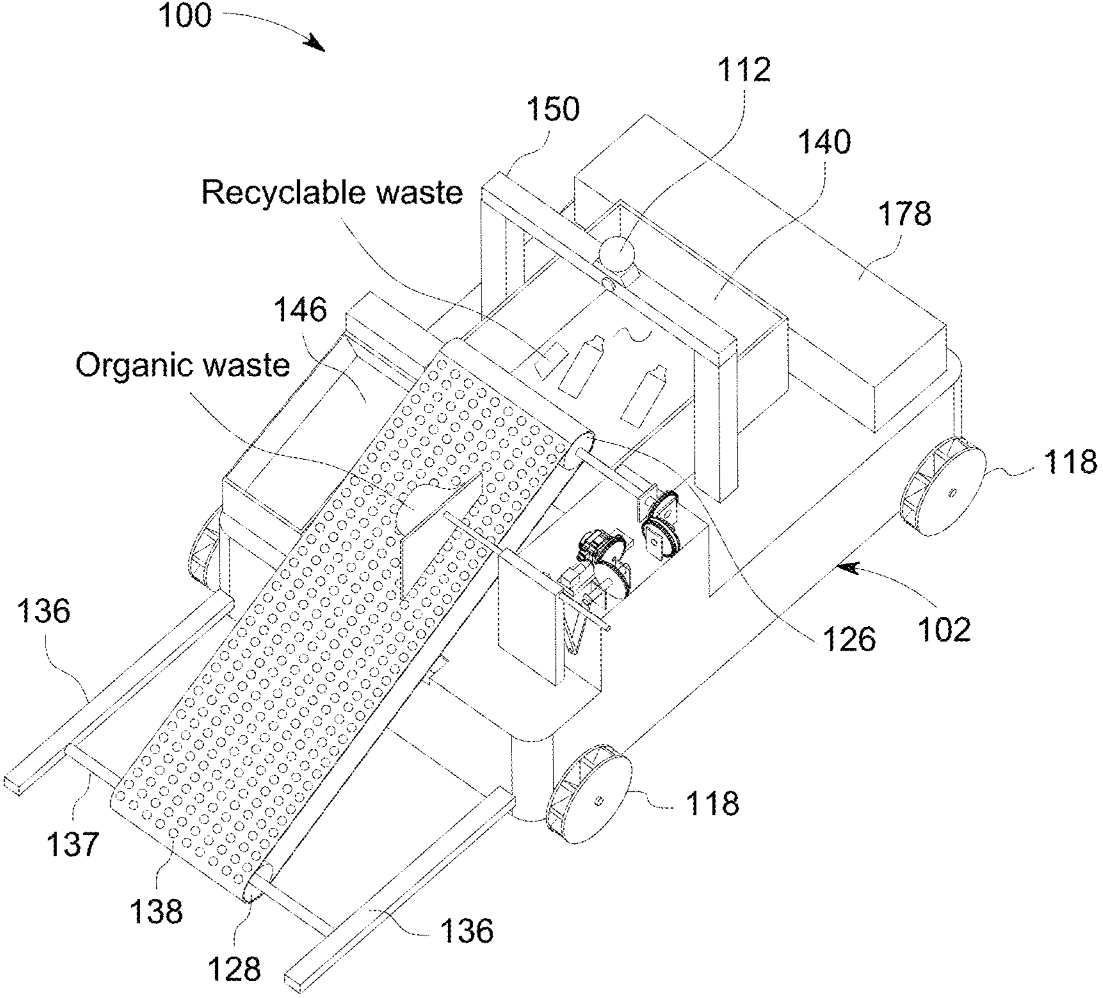
FIG. 4F illustrates an isometric view of the autonomous water vehicle while transferring the organic waste to a first storage chamber using a scraping member, in accordance with of the invention.

In one embodiment herein, the conveyor unit 106 is inclinedly mounted on a plurality of support rollers (126, 128) (as shown in FIG. 4F). The conveyor unit 106 is configured to collect and elevate floating waste from the water surface upon actuation while the autonomous water vehicle 100 maneuvers across the water surface. The plurality of support rollers (126, 128) is rotatably mounted on respective elongated shafts (137, 139) secured to the floating body 102 and to a pair of extended columns 136, thereby providing rotational support and guided movement for the conveyor unit 106 along its inclined conveying path. The plurality of support rollers (126, 128) comprises a first support roller 126, and a second support roller 128 (as shown in FIG. 4F).

In one embodiment herein, the first support roller 126 is rotatably connected to the drive gear 124 via a gear unit 130. The first support roller 126 is configured to be rotated upon rotation of the drive gear 124. In one embodiment herein, the gear unit 130 comprises a compound gear 132, and a driven gear 134. In one embodiment herein, the compound gear 132 is operably connected to the drive gear 124. The compound gear 132 is a double-surfaced bevel gear. The compound gear 132 is configured to be rotated in a counter direction of the drive gear 124 while rotating the drive gear 124.

In one embodiment herein, the driven gear 134 is rotatably connected to the first support roller 126 via a first elongated shaft 137. The driven gear 134 is configured to be rotated upon rotation of the compound gear 132. In particular, one surface of the compound gear 132 is rotatably connected to the drive gear 124, and another surface of the compound gear 132 is rotatably connected to the driven gear 134. The first elongated shaft 137 is rotatably positioned on the floating body 102 using first supporting brackets 167.

In one embodiment herein, the second support roller 128 is positioned on the pair of extended columns 136 of the floating body 102 via a second elongated shaft 139. In particular, the pair of extended columns 136 are positioned at the front end of the floating body 102. The second support roller 128 is rotatably connected to the first support roller 126 via a conveyor belt 138. In particular, the conveyor belt 138 having a plurality of perforations 141 defined across its surface to permit drainage of water while retaining and transporting floating waste collected from the water surface. The plurality of perforations 141 is dimensioned and spatially distributed across the conveyor belt 138 to optimize water discharge and reduce load on the conveyor unit 106. The conveyor belt 138 is configured to move from the second support roller 128 to the first support roller 126, thereby collecting the floating waste present on the water surface and transferring it into a second storage chamber 140. The conveyor belt 138 is made of a corrosion-resistant mesh material to prevent clogging while allowing efficient water drainage.

In one embodiment herein, the scraping assembly 107 is operably positioned on the floating body 102. The scraping assembly 107 is configured to perform a sorting operation for separating organic waste from the floating waste upon detection during a cleaning process. The scraping assembly 107 comprises a scraping member 108, and a linear actuation unit 144.

In one embodiment herein, the scraping member 108 is movably positioned relative to the conveyor belt 138. In one embodiment herein, the linear actuation unit 144 is mounted on the floating body 102. The linear actuation unit 144 is operably connected to the scraping member 108. The linear actuation unit 144 is configured to operably couple to the driving unit 104 through a bevel gear 142 when the driving unit 104 is translated toward the linear actuation unit 144. The bevel gear 142 is rotatably supported by a supporting shaft 168 and second supporting brackets 169.

The bevel gear 142 is operably connected to the drive gear 124. The bevel gear 142 is configured to be rotated to enable the linear actuation unit 144 to drive the scraping member 108 in the linear reciprocating direction across the conveyor unit 106 for performing the sorting operation. In particular, activation of the linear actuation unit 144 drives the scraping member 108 in a linear reciprocating direction across the conveyor unit 106 to push the organic waste from the conveyor unit 106 into a first storage chamber 146 mounted on the floating body 102, thereby performing the sorting operation. The first storage chamber 146 and the second storage chamber 140 may be configured in any suitable geometric shape, including but not limited to a square, rectangular, or circular form.

In one embodiment herein, the linear actuation unit 144 comprises a first link member 172 and a second link member 174, which work in tandem to facilitate the precise and efficient movement of the scraping member 108. The first link member 172 is rotatably connected to the bevel gear 142 via a supporting shaft 168, ensuring seamless mechanical coordination. Specifically, the supporting shaft 168 is securely mounted on the floating body 102 using the second supporting brackets 169, thereby providing a stable pivot point for smooth and controlled rotational movement. This arrangement enhances the operational reliability of the scraping mechanism, ensuring effective waste removal without excessive mechanical stress.

In one embodiment herein, the linear actuation unit 144 refers to a mechanically defined actuator configured to generate controlled linear displacement along a predefined axis. During operation, the linear actuation unit 144 is mounted directly beneath the scraper assembly 107 and is operably coupled to the drive gear 178. When the control unit 116 actuates the linear actuation unit 144, the extendable shaft 148 extends or retracts linearly, thereby shifting the driving unit 104 to selectively engage the bevel gear 142 with the driven gear 174. This linear motion enables activation of the scraping member 108 for removing organic waste, algae, or debris adhered to the conveyor belt 138. The structural limits of the linear actuation unit 144 ensure that the translation path remains strictly linear, enabling reliable engagement and disengagement of the gear train during repeated operational cycles.

In one embodiment herein, the second link member 174 is pivotably connected to the first link member 172, thereby enabling the transmission of motion while accommodating angular displacement. The second link member 174 is configured to be actuated upon rotation of the first link member 172, thereby enabling the scraping member 108 to move linearly and push the organic waste from the conveyor belt 138 into the first storage chamber 146 mounted on the floating body 102, thereby performing the sorting operation.

In one embodiment herein, one end of the first link member 172 is operatively connected to the bevel gear 142 through the supporting shaft 168. Another end of the first link member 172 is coupled to a primary end of the second link member 174. In addition, a secondary end of the second link member 174 includes a projection 175, which is engaged to a connecting column 170 of the scraping member 108. The connecting column 170 is positioned in a guide slot 177 formed in a mounting member 179, which is fixedly disposed on the floating body 102. This arrangement allows the motion generated by the bevel gear 142 to be transmitted through the first link member 172 and second link member 174, thereby enabling controlled linear movement of the scraping member 108 along the guide slot 177.

In one embodiment herein, the actuator 110 is positioned on the floating body 102. The actuator 110 is configured to be activated to slide the driving unit 104 from a first end to a second end along the length of the support member 122 via the extendable shaft 148, thereby engaging the drive gear 124 with the bevel gear 142 for performing a scraping operation. In particular, the extendable shaft 148 is configured be retracted to slide the driving unit 104 from the first end to the second end along the length of the support member 122 upon activation of the actuator 110. The extendable shaft 148 is a telescopic shaft.

In one embodiment herein, the first capturing unit 112 is positioned on a support frame 150, which is affixed to the floating body 102. The first capturing unit 112 is configured to capture images of the water surface and detect floating waste on the water surface. The first capturing unit 112 is a 360-degree rotatable artificial intelligence (AI) camera. In one embodiment herein, the second capturing unit 114 is positioned on the support frame 150. The second capturing unit 114 is configured to detect the organic waste present on the conveyor belt 138 during the cleaning process. The second capturing unit 114 is an artificial intelligence (AI) camera.

Figure 1D:
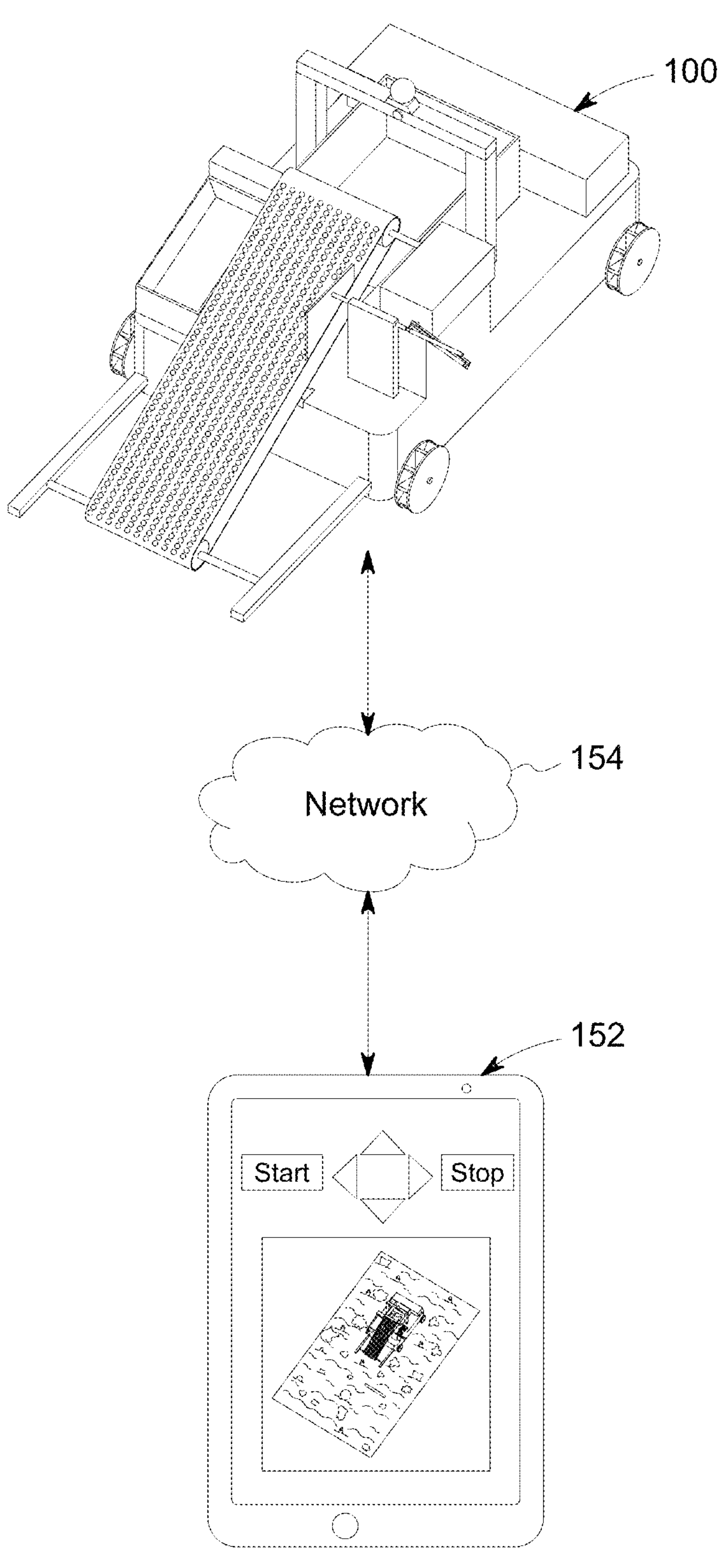
FIG. 1D illustrates an isometric view of the autonomous water vehicle that is in communication with a user device, in accordance with of the invention.

In one embodiment herein, the control unit 116 is operably disposed on the floating body 102. The control unit 116 is in communicate with the driving unit 104, a plurality of drive actuators 120 of the plurality of propulsion wheels 118, and the actuator 110. The control unit 116 of the autonomous water vehicle 100 is in communication with a user device 152 through an Internet of Things (IoT) communication module 166. In particular, the control unit 116 is in communication with the user device 152 through a network 154 (as shown in FIG. 1D).

The control unit 116 is configured to acquire image data from the first capturing unit 112 and the second capturing unit 114, respectively. The control unit 116 is configured to process the image data and perform threshold-based classification to identify floating waste characteristics include recyclable waste and organic waste. The control unit 116 is configured to selectively actuate the driving unit 104 to linearly reposition for operating either the conveyor unit 106 to initiate the cleaning process, or the linear actuation unit 144 to drive the scraping member 108 across the conveyor unit 106 for transferring the organic waste into the first storage chamber 146. The control unit 116 is further configured to communicate with the user device 152 through a network 154, thereby enabling remote activation, status retrieval, and real-time monitoring of the cleaning process including waste detection events, conveyor unit activity, the sorting operation, and positional movement of the autonomous water vehicle during the cleaning process.

In one embodiment herein, the autonomous water vehicle 100 further comprises a second storage chamber 140 that is disposed on the floating body 102. The second storage chamber 140 is configured to receive the recyclable waste. The conveyor belt 138 is controllably operated to transport and discharge segregated recyclable waste into the second storage chamber 140 during the cleaning operation. The conveyor belt 138 is made of a corrosion-resistant mesh material to prevent clogging while allowing efficient water drainage.

In one embodiment herein, the autonomous water vehicle 100 comprises an artificial intelligence (AI) module 156 and a sensing unit 158. In one embodiment herein, the AI module 156 is configured to detect and classify the floating waste into recyclable and organic categories using AI-based image processing. In one embodiment herein, the sensing unit 158 is configured to detect obstacles while autonomous water vehicle 100 maneuvering across the water surface and transmit the detected image data to the control unit 116 for initiating an adjustment to the autonomous water vehicle's path. The sensing unit 158 includes, but not limited to, a LiDAR and a realSense sensor. In one embodiment herein, the autonomous water vehicle 100 comprises a global positioning system (GPS) module 160. The GPS module 160 is configured to track and navigate the autonomous water vehicle 100 on the water surface. The GPS module 160 is configured to perform real-time tracking of the autonomous water vehicle 100 and transmit the tracked data to the control unit 116 for autonomous path determination and guidance.

In one embodiment herein, the autonomous water vehicle 100 comprises a first power source 162 and a second power source 164. In one embodiment herein, the first power source 162 is configured to supply electrical power to the control unit 116 and the plurality of drive actuators 120. In particular, the plurality of drive actuators 120 comprises waterproof DC-geared motors, operating within a voltage range of 12 v to 24 V, with a rotational speed of 50 to 100 RPM and a torque output of 10 to 15 Nm.

Each drive actuator 120 is equipped with an IP67-rated enclosure, ensuring protection against water ingress and enhanced durability for prolonged operation in aquatic environments. In one embodiment herein, the second power source 164 is configured to supply electrical power to the driving unit 104 and the actuator 110. The first power source 162 and the second power source 164 are batteries. The first power source 162 and the second power source 164 are provided with USB ports to facilitate recharging.

TABLE 2

| Parameter | Preferred Specification | Acceptable Range | Notes |
|---|---|---|---|
| Role | Drives BLDC + gear unit (conveyor/scraper) | — | Isolated from electronics to keep noise off AI stack |
| Chemistry/ string | $LiFePO_4$, 8S | 8S-9S $LiFePO_4$ | 8S nominal 25.6 V fits 24 V bus perfectly |
| Nominal/max voltage | 25.6 V nom, 29.2 V max | 24-30 V system | Verify driver OV cut-off ≥30 V |
| Capacity (Ah) | 30 Ah | 24-40 Ah | Size for 2-4 h operation |
| Energy (Wh) | ≈768 Wh | 600-1,000 Wh | 25.6 V × 30 Ah |
| Usable energy (80%) | ≈614 Wh | — | For runtime calcs |
| Max cont. discharge | ≥60 A (BMS) | 40-80 A | Motor avg 6-8 A; peaks 18-22 A; headroom for jams |
| Peak discharge (≤3 s) | ≥90 A | 60-120 A | For 300-400 W, short surges |
| Internal BMS | 60 A cont., 90 A peak; passive balancing ≥100 mA | — | OVP/UVP/OCP/OTP/NTC; cell balancing |
| Connectors | Anderson SB50 or M8 studs | XT60 (sealed) | Separate charge vs load connectors preferred |
| Protection/IP | IP67 enclosure + vent plug | IP65-IP68 | Potting of feedthroughs; drain path for splash |
| Fuse/breaker | 30 A slow-blow inline + 60 A main breaker | — | Breaker doubles as service disconnect |
| Contactors | Pre-charge + 24 V latching contactor | — | Prevents inrush to motor driver caps |
| Charge method | CC/CV $LiFePO_4$ | — | 0.3-0.5 C recommended |
| Charger specification | 29.2 V, 10 A | 5-15 A | Isolated, IP67, reverse-polarity safe |

Table 2 represents the preferred and acceptable specifications for the first power source 162 used to drive the plurality of drive actuators 120 and gear unit 130 of the autonomous water vehicle 100. It describes the electrical characteristics, safety features, capacity requirements, and mechanical protection needed to ensure reliable operation in aquatic environments.

TABLE 3

| Parameter | Preferred Specification | Acceptable Range | Notes |
|---|---|---|---|
| Role | SBC/AI cams, networking, sensors, lights | — | Keep clean supply; no motor noise |
| Chemistry / string | $LiFePO_4$, 4S | 3S-4S $LiFePO_4$ | 4S nominal 12.8 V –> easy 12 V rail |
| Nominal / max voltage | 12.8 V nom, 14.6 V max | 12-15 V | DC/DCs must tolerate 10-15 V |
| Capacity (Ah) | 20 Ah | 12-30 Ah | Size by aux load (typ. 20-40 W) |
| Energy (Wh) | ≈256 Wh | 150-400 Wh | 12.8 V × 20 Ah |
| Usable energy (80%) | ≈205 Wh | — | For runtime calcs |
| Max cont. discharge | ≥20 A (BMS) | 10-30 A | Plenty for DC/DC rails + lights |
| Peak discharge (≤3 s) | ≥40 A | 20-60 A | For lighting inrush/AI spikes |
| Internal BMS | 20 A cont., 40 A peak; passive balancing ≥100 mA | — | Same protections as main pack |

TABLE 3-continued

| Parameter | Preferred Specification | Acceptable Range | Notes |
|---|---|---|---|
| DC/DC rails | 12 V→5 V/10 A; 12 V→9-19 V/6 A (as needed) | — | Feed SBC, cameras, routers |
| Connectors | M12-A (power) or XT30; separate charge jack | — | Locking, IP-rated |
| Protection / IP | IP67 enclosure + gland | IP65-IP68 | Separate low-voltage bay in hull |
| Fuse | 10 A resettable + per-rail blade fuses | — | Protect downstream harness |
| Charger spec | 14.6 V, 5 A | 3-10 A | Isolated, IP67 |

Table 3 represents the preferred and acceptable specifications for the second (auxiliary) power source 164, which supplies clean, isolated power to sensitive electronics such as single-board computers (SBCs), first capturing unit 112, second capturing unit 114, networking hardware, sensors, and lighting. This second power source 164 is intentionally separated from the main motor battery to prevent electrical noise and voltage fluctuations from affecting computational and sensing systems.

In one embodiment herein, the first power source 162 provides the electrical power to the control unit 116 and the plurality of drive actuators 120. Here, the first power source 162 is the 8S $LiFePO_4$ battery pack provides approximately 614 Wh of usable energy on a 25.6 V bus. Each wheel drive actuator 120 consumes an average of 90 W under standard operating conditions, thereby resulting in a total of 360 W for all four BLDC wheel drives. The control unit 116 including the SBC, MCU, and associated I/O adds an additional 15 W of power consumption. Accordingly, the total average load on the first power source 162 is approximately 375 W. This yields an estimated runtime of 614 Wh÷375 W≈1.64 hours. At a bus voltage of 25.6 V, the corresponding average current draw is approximately 14.7 A.

In one embodiment herein, the second power source 164 provides the electrical power to the driving unit 104, and the actuator 110. The second power source 164 is the 8S $LiFePO_4$ auxiliary pack (~10 Ah) provides approximately 205 Wh of usable energy on a 25.6 V bus, which is well-suited for powering 24 V auxiliary loads. Under standard operating conditions, the driving unit 104 consumes an average of 72 W (based on 120 W rated power at 40/60/80% duty levels). The actuator 110 contributes roughly 2 W on average, and the first encoder 180 and the second encoder 182 draw approximately 1 W. This results in a total average load of about 75 W on the second power source 164. Accordingly estimated runtime: 205 Wh÷75 W≈2.73 hrs and average current draw at 25.6 V:≈2.9 A.

In one embodiment, the second encoder 182 continuously monitors the rotations of the actuator 110 in real time and transmits corresponding feedback to the control unit 116. When the actuator 110 reaches the predefined rotation threshold, the control unit 116 deactivates the actuator 110, thereby restoring the scraping unit 108 to its initial position. This reference position is designated as "Position B.

In one embodiment herein, the autonomous water vehicle 100 achieves effective surface cleaning based on its pickup width, operating speed, and available battery runtime. The autonomous water vehicle 100 provides an effective pickup width of approximately 0.20 m, corresponding to the conveyor width of about 200 mm. In standard mode, the autonomous water vehicle 100 travels at an average speed of 0.40 m/s, and the first power source 162 delivers a runtime of approximately 1.64 hrs. Using these values, the ideal surface area covered in a single charge can be calculated as the product of speed, operating time, and pickup width. This yields a theoretical coverage of about 472 $m^2$ per charge.

$$\text{Area }(\text{m}^2) = v(\text{m/s}) \times \text{time (s)} \times W_{eff}(\text{m}) = 0.40 \times 5904 \times 0.20 = 472.32\ \text{m}^2$$

However, in practical scenarios, the effective area is typically reduced due to navigation turns, maneuvering inefficiencies, and necessary overlap between passes. Accounting for an efficiency factor of approximately 85%, the standard mode with a 0.20 m pickup width yields a practical coverage of 472×0.85=401 $m^2$, which represents the realistic area achievable per charge. To support accurate movement and cleaning operations, the autonomous water vehicle 100 employs a position feedback system based on incremental positions of the first encoder 180 and the second encoder 182. These first encoder 180 and the second encoder 182 are mounted on the shafts of both the driving unit 104 and the actuator 110, respectively. By continuously recording rotational counts, the first encoder 180 and the second encoder 182 provide real-time position and motion feedback to the control system. This enables precise control of the conveyor, scraper, and gear-shifting mechanisms, thereby ensuring consistent cleaning performance and reliable operation throughout the vehicle's duty cycle.

TABLE 4

| Parameter | Preferred Specification | Acceptable Range | Notes |
|---|---|---|---|
| Type | Incremental, quadrature A/B + Z index | — | Optical or magnetic; sealed housing |
| Resolution (CPR) | 1024 CPR | 512-2048 CPR | 1024 CPR → 4096 counts/rev with ×4 decoding |
| Output interface | RS-422 differential (A, /A, B, /B, Z, /Z) | Push-pull (HTL), open-collector | RS-422 is best for long, noisy runs |
| Supply voltage | 5-26 V | 4.5-30 V | Use 5 V if PCB receiver is TTL |

TABLE 4-continued

| Parameter | Preferred Specification | Acceptable Range | Notes |
|---|---|---|---|
| Max pulse rate | ≥100 kHz | ≥300 kHz preferred | Plenty for 90 rpm × 4096 cpr ≈ 6.1 kHz |
| Max shaft speed | ≥6000 rpm | ≥3000 rpm | Huge headroom (you run ~50-90 rpm) |
| Accuracy | ±0.5° mech | +1.0° | Index gated to A&B recommended |
| Index (Z) | 1 PPR, gated | 1 PPR | For homing/phase sync before shifting |
| Bore/coupling | Ø8-10 mm hollow-bore + flexible coupling | Ø6-12 mm | Avoids bearing preload on encoder |
| Environmental | IP67 | IP65-IP68 | Splash/brief immersion resistant |
| Cable/connector | 2 m PUR jacket, shielded; M12 A-coded, 8-pin | 0.5-5 m | Twisted pairs for A/B/Z differentials |
| Temperature | −20 to +70° C. | −40 to +85° C. | Match rest of system |
| Shock/ vibration | ≥100 g/≥10 g | | Marine duty |
| EMC/ESD | EN 61000-6-2/-4; +8 kV air | — | Add TVS at receiver |
| Materials | SS shaft, anodized/epoxy body | — | Corrosion resistant |

Table 4 outlines the preferred and acceptable specifications for the incremental position data of the first encoder 180 and the second encoder 182. These first encoder 180 and the second encoder 182 provide precise rotational feedback for the conveyor unit 106 and the actuator 110, thereby enabling accurate motion control, gear-shifting alignment, and scraper positioning.

TABLE 5

| Parameter | Preferred Specification | Acceptable Range | Notes |
|---|---|---|---|
| Type | Incremental, quadrature A/B + Z index | — | Mount on lead-screw or gear that is 1:1 with travel |
| Resolution (CPR) | 256 CPR | 128-512 CPR | With ×4: 1024-2048 counts/rev of screw |
| Output interface | RS-422 differential | Push-pull (HTL) | Noise-immune alongside motor currents |
| Supply voltage | 5-26 V | 4.5-30 V | Same rail as drive encoder for simplicity |
| Max pulse rate | ≥50 kHz | ≥100 kHz | Adequate for fast shifts |
| Max shaft speed | ≥3000 rpm | ≥1500 rpm | You'll be ≤600-900 rpm at 10-30 mm/s (lead 2 mm) |
| Accuracy | ±0.7° mech | ±1.5° | Plenty for actuator positioning |
| Index (Z) | 1 PPR (optional) | — | Limits provide absolute ends; Z helps mid-span home |
| Bore/coupling | Ø6-8 mm hollow-bore + flexible coupling | Ø5-10 mm | Keep side-load off encoder |
| Environmental | IP67 | IP65-IP68 | Seal gland toward hull interior |
| Cable/connector | 2 m PUR, shielded; M8/M12 locking | 0.5-5 m | Route away from H-bridge leads |
| Temperature | −20 to +70° C. | −40 to +85° C. | Matches actuator environment |
| Shock/vibration | ≥100 g/≥10 g | — | Short, infrequent movements |
| EMC/ESD | EN 61000-6-2/-4; +8 kV air | — | TVS + common-mode choke at MCU |
| Materials | SS shaft, coated body | — | Corrosion resistant |

Table 5 represents the preferred and acceptable specifications for the second encoder 182. This second encoder 182 tracks the actuator's rotational and linear displacement to ensure accurate positioning when engaging either the conveyor-drive gear set or the scraper-drive gear set.

In one embodiment herein, the IoT communication module 166 is configured to enable real-time data transmission between the control unit 116 and the user device 152 for controlling the floating waste-collecting process. The IoT communication module 166 includes at least one of Wi-Fi, Bluetooth, and LPWAN (LoRaWAN or NB-IoT) connectivity for seamless data transmission between the control unit 116 and the user device 152. In one embodiment herein, the AI module 156 utilizes a Raspberry Pi with OpenCV or TensorFlow Lite for floating waste detection and a Jetson Nano or Coral Edge TPU for real-time waste classification and processing. In one embodiment herein, the sensing unit 158 is configured to enhance real-time path adjustment and object avoidance.

In one example embodiment, the AI module 156 comprises a processor and a non-transitory memory storing executable instructions. The executable instructions define a convolutional-neural-network-based image-classification model having a predetermined architecture including an input layer for receiving the image data from the first capturing unit 112, a plurality of convolution layers for extracting spatial features, at least one pooling layer for dimensionality reduction, and a fully connected output layer that produces a classification score representing a likelihood that detected waste belongs to recyclable or organic categories.

The AI module 156 is trained using labeled datasets containing examples of floating waste, recyclable materials, and organic waste including algae. During operation, the AI module 156 processes real-time image data from the first capturing unit 112 and generates a classification output, which the control unit 116 uses to initiate a corresponding physical action including adjusting navigation, activating the conveyor unit, or operating the scraping assembly 107.

In one example embodiment herein, the AI module 156 is trained using a curated dataset including image and video samples representative of floating waste, recyclable items, and organic waste commonly found in ponds, lakes, rivers, and slow-moving canals. The dataset includes annotated examples of plastics (bottles, wrappers, cups, films), paper-based waste (cartons, cardboard, tissues), and organic matter (leaves, algae clusters, wood debris, decaying biomass). The dataset further includes samples of clean water, ripples, shadows, floating animals, and reflections to improve robustness against false positives. The images are acquired under varied lighting, water-flow conditions, turbidity levels, and seasonal variations to ensure that the trained model generalizes across heterogeneous aquatic environments. The training dataset comprises both RGB image sequences from the first capturing unit 112 and near-field region-of-interest (ROI) samples obtained from the second capturing unit 114 during prototype testing.

In one embodiment herein, the AI module 156 processes input frames in a standardized digital format. The input frames such as images undergo color-space normalization, histogram equalization, and noise suppression to mitigate distortion caused by water reflection or surface turbulence. In embodiments employing spectral or temporal analysis, consecutive frames are stacked to form a temporal window of 3-5 frames, enabling the AI module 156 to differentiate static floating waste from transient reflections or moving aquatic organisms. During preprocessing, irrelevant regions outside the conveyor capture path are masked using a geometric ROI filter to reduce computational load and enhance classification precision.

In one embodiment herein, the AI module 156 uses a convolutional neural network architecture trained using supervised learning. A variant of YOLOv5-Nano or MobileNetV2 is employed for floating-waste detection, while a lightweight classification head is trained for differentiating recyclable waste from organic waste. The trained model is subsequently quantized for deployment on the Jetson Nano, Coral Edge TPU, or Raspberry Pi platforms.

In one embodiment herein, during real-time operation, the control unit 116 executes the trained neural-network model in inference mode. Each processed frame from the first capturing unit 112 generates a list of bounding boxes, object labels. The control unit 116 maps these outputs to specific actuator commands. When recyclable waste is detected with a confidence exceeding a predefined threshold, the conveyor unit 106 is maintained in forward rotation to deliver the recyclable waste into the second storage chamber 140. When organic waste or harmful algae is detected by the second capturing unit 114, the control unit 116 determines whether to shift the driving unit 104 to engage the bevel gear 142 and activate the linear actuation unit 144, thereby driving the scraping member 108 across the conveyor belt 138 for organic-waste removal. The control unit 116 commands conveyor speed adjustments, and propulsion wheel differentials are computed based on detection coordinates, allowing precise alignment of the autonomous water vehicle 100 with the waste location.

In one embodiment herein, the control unit 116 dynamically adjusts navigation behavior using closed-loop control logic tied to AI-derived detection data. When floating waste is identified on the right side, the propulsion wheels 118 on the left side are accelerated while the right-side wheels are slowed or reversed to steer the autonomous water vehicle 100 toward the target waste. The magnitude of steering correction is proportional to the offset between the detected waste centroid and the geometric center of the image.

TABLE 6

| Function | AI Module | Reason |
|---|---|---|
| Floating waste detection (360° monitoring) | Raspberry Pi with OpenCV/ TensorFlow Lite | AI-based image processing for identifying floating waste. |
| Waste classification (recyclable vs. organic) | Jetson Nano/Coral Edge TPU | Efficient AI inference for real-time classification of waste. |
| Obstacle detection and navigation | Intel RealSense/LiDAR (RPLIDAR A1/A2) | Helps in avoiding obstacles and adjusting path automatically. |

Table 6 represents the key functions of the autonomous water vehicle 100 that rely on artificial intelligence, along with the corresponding hardware modules best suited for each task and the reasons for their selection. Finally, obstacle detection and navigation utilize sensors like Intel RealSense or LiDAR modules (e.g., RPLIDAR A1/A2). These sensors generate depth maps and distance measurements, helping the autonomous water vehicle 100 avoid obstacles and adjust its navigation path safely and accurately.

FIG. 1D refers to an isometric view of the autonomous water vehicle 100 that is in communication with the user device 152. In one embodiment herein, the control unit 116 of the autonomous water vehicle 100 is in communication with the user device 152. The user device 152, that includes directional control buttons for navigation, start and stop commands, and a real-time visual display of the water vehicle's operational status. The user device 152 communicates with the control unit 116 via the Internet of Things (IoT) communication module 166, thereby ensuring seamless data exchange. The user device 152 is a computing device, which includes, but not limited to, a smartphone, a mobile, a computer, a laptop and a personal digital assistant (PDA).

The control unit 116 is in continuous communication with the user device 152 through the network 154, thereby allowing the user to monitor and adjust the water vehicle's movement and waste collection processes. The user device 152 provides real-time feedback, thereby allowing the user to make precise adjustments remotely. The autonomous water vehicle 100 ensures enhanced operational efficiency, autonomous navigation, and adaptive route optimization based on environmental conditions. The control unit 116 is a NVIDIA Jetson Orin Nano (8 GB). The control unit 116 is stored with threshold motor rotation values for the driving unit 104 and the actuator 110.

In one example embodiment, the autonomous water vehicle 100 is configured to support remote operation by a user through the user device 152 communicatively coupled to the autonomous water vehicle 100 via the network 154 and the onboard Internet-of-Things (IoT) communication module 166. The network 154 may include, without limitation, a wireless local-area network (WLAN), a cellular communication network, a satellite communication link, or any combination thereof capable of enabling bidirectional data exchange.

The autonomous water vehicle 100 comprises the control unit 116 that includes one or more processors, microcontrollers, or embedded computing platforms. The control unit 116 is operatively interfaced with the IoT communication module 166 such that command instructions originating from the user device 152 are received by the IoT communication module 166 and subsequently communicated to the control unit 116 for execution. These command instructions may include navigation commands, mission initialization commands, speed adjustments, obstacle avoidance overrides, waste-collection activation instructions, or any operational parameter updates.

In certain embodiments, the IoT communication module 166 comprises a wireless communication transceiver configured to implement one or more communication protocols, including but not limited to MQTT, HTTP/HTTPS, WebSocket, LTE-M, NB-IoT, or 5G NR. The IoT communication module 166 is further configured to transmit operational telemetry from the autonomous water vehicle 100 to the user device 152 via the network 154. Such telemetry may include geolocation data, inertial sensor outputs, environmental sensor measurements, battery status, video streams, AI-generated waste-classification results, and system-health diagnostics.

The user device 152 is configured to establish a secure communication session with the IoT communication module 166 through the network 154. During operation, the user device 152 transmits remote-control inputs and receives real-time feedback from the autonomous water vehicle 100, thereby enabling continuous supervisory control, mission monitoring, and manual intervention when required. In one embodiment, the user device 152 executes a software application or web interface that interprets the received telemetry and presents it through an interactive dashboard for user interaction.

Accordingly, the communication infrastructure comprising the user device 152, network 154, IoT communication module 166, and control unit 116 collectively enables remote, low-latency, and reliable operation of the autonomous water vehicle 100, even when the user is located at a geographically remote site relative to the autonomous water vehicle 100.

TABLE 7

| Actuator's motor rotations | Actuator extension/ retraction | Comment |
|---|---|---|
| 20 (Anti-clockwise) | Retraction (40 mm) | The drive gear engages bevel gear to perform scraping operation |
| 20 (Anti-clockwise) | Extension (40 mm) | The drive gear engages with compound gear to perform waste collection operation (Initial position) |

Table 7 represents the relationship between the actuator motor's rotation, the corresponding extension or retraction of the actuator 110, and the resulting operational mode of the autonomous water vehicle 100.

TABLE 8

| | Driving Unit | Drive gear | Bevel gear |
|---|---|---|---|
| Scraping | 0.8 rotation | 0.8 rotation | 1 rotation |

Table 8 represents the rotational relationship between the driving unit 104, the drive gear 124, and the bevel gear 142 during the scraping operation of the autonomous water vehicle 100.

During scraping, the driving unit 104 rotates 0.8 turns, which results in the bevel gear 124 also rotating 0.8 turns. Because the drive gear 124 is engaged with the bevel gear 142 in this mode, the motion is transferred such that the bevel gear 142 completes 1 full rotation. This gearing relationship provides the speed and motion required to drive the scraping mechanism effectively.

TABLE 9

| Block | Signal / Function | MCU Peripheral | Pin (example) | Electrical | Notes |
|---|---|---|---|---|---|
| CAN to wheel ESCs (Electronic Speed Controller) | CAN-FD1 TX/RX | FDCAN1 | PD1 / PD0 | 3.3 V, diff via transceiver | Bus to 4× wheel ESCs (120 Ω at one end) |
| CAN to conveyor ESC | CAN-FD2 TX/RX | FDCAN2 | PB13 / PB12 | 3.3 V, diff via transceiver | Separate segment (or same bus), 120 Ω |
| Single-Board Computer (SBC) link (console) | UART3 TX/RX | USART3 | PD8 / PD9 | 3.3 V | Jetson/Pi serial console & debug |
| Drive encoder (belt) | Quad A/B | TIM2 (Encoder) | PA0 / PA1 | 3.3 V via RS-422 receivers | 1024 CPR; Z-index on PA2 (GPIO ext int) |

TABLE 9-continued

| Block | Signal / Function | MCU Peripheral | Pin (example) | Electrical | Notes |
|---|---|---|---|---|---|
| Second encoder | Quad A/B | TIM4 (Encoder) | PB6 / PB7 | 3.3 V via RS-422 receivers | 256 CPR; Z (optional) on PB5 |
| Actuator H-bridge | PWM A/B | TIM8 CH1/CH2 | PC6 / PC7 | 3.3 V | DIR via PC8, EN via PC9 |
| Pack-1 volt/cur | ADC V/I | ADC1 IN12/IN13 | PC2 / PC3 | 0-3.3 V via div/shunt amp | Voltage divider + INA |
| Pack-2 volt/cur | ADC V/I | ADC1 IN10/IN11 | PC0 / PC1 (alt) | 0-3.3 V | Or move to ADC3 pins as needed |
| USB device (DFU/logs) | USB FS D+/D− | USB_OTG_FS | PA12 / PA11 | 5 V tolerant | For firmware/log extraction |
| Contactor/Pre-charge | ON-OFF | GPIO | PE2 / PE3 | 3.3 V to driver | Sequenced on power-up |
| USB-C PD Ready | $I^2C$ to PD-controller | I2C3 | PA8 / PC9 | 3.3 V | Talk to PD sink controller (charge bay) |

Table 9 represents a complete MCU interface map that defines how the autonomous water vehicle's control electronics connect to motor ESCs, the first encoder 180, the second encoder 182, actuators, sensors, power management circuits, a single-board computer, USB and CAN communication buses.

TABLE 10

| Requirement | Communication Module | Reason |
|---|---|---|
| Short-range communication (≤10 m) | Bluetooth (HC-05 / HM-10) | Low power consumption, suitable for app-based direct control. |
| Mid-range (100 m-500 m) | Wi-Fi (ESP32 / ESP8266) | Supports cloud connectivity, OTA updates, and real-time data streaming. |
| Long-range communication (several km) | LoRa (RAK3172 / SX1276) | Suitable for remote areas without internet, low power consumption. |
| Cellular connectivity | NB-IoT (SIM7000) / 4G LTE (SIM7600) | Works in areas without Wi-Fi, reliable for continuous data transmission. |

Table 10 summarizes the different communication options available for the autonomous water vehicle based on the required operating range. Each communication module 166 is selected to match specific distance needs, power constraints, and data-transfer requirements.

In one embodiment, the IoT communication module 166 comprises a wireless transceiver, a network interface controller, and a non-transitory memory storing communication protocol instructions. The instructions define message formatting, packet-handling, and error-correction operations for transmitting status data and receiving control commands. The IoT communication module 166 supports at least one wireless protocol including Wi-Fi (IEEE 802.11), Bluetooth Low Energy, LoRaWAN, or LTE cellular communication.

Operational data generated by the control unit 116, including propulsion-wheel speeds, encoder feedback, conveyor-unit state, and GPS coordinates, are periodically transmitted to a remote user device via the IoT communication module 166. Upon receiving control commands from the user device, the IoT communication module 166 outputs the commands to the control unit 116 for adjusting navigation or executing waste-collection functions. This architecture provides structured and reliable wireless communication directly integrated with physical machine control.

TABLE 11

| Requirement | Recommended Module | Protocol Used | Reason |
|---|---|---|---|
| AI Camera Video Stream | Raspberry Pi Camera (OV5647, IMX219) / ArduCam | CSI (Camera Serial Interface) / MIPI | High-speed video streaming and AI processing. |
| AI Image Processing | Jetson Nano / Coral Edge TPU / Raspberry Pi | USB / SPI / I2C | Processes images and sends detection data to the controller. |
| AI Data to Controller | ESP32 / UART-to-USB Bridge (FTDI FT232RL) | UART / SPI / I2C | Transfers AI-processed waste classification data to the main controller. |

Table 11 outlines how different hardware modules within the autonomous water vehicle 100 interact to support AI-based waste detection, image processing, and communication with the control unit 116. Each requirement is paired with a recommended hardware module, the communication protocol it uses, and the reason for its selection.

TABLE 12

| Motor Type | Recommended Module | Protocol Used | Reason |
|---|---|---|---|
| DC Propelling Motors | Motor Driver (L298N / BTS7960 / VNH2SP30) | PWM (Pulse Width Modulation) + UART | Controls motor speed and direction. |
| Driving Unit's Motor | Motor Driver (L298N / TB6612FNG) | PWM + UART | Adjusts conveyor belt movement for waste collection. |
| | Servo Driver (PCA9685) / Stepper Driver (A4988) | I2C / PWM | Controls scraping member for organic waste removal. |

Table 12 represents the recommended motor-control modules, the communication protocols they use, and the reasons for choosing each module in the autonomous water vehicle 100. Each motor type, propulsion motors, conveyor-drive motor, and scraping mechanism, requires a different control approach based on torque, precision, and motion requirements.

TABLE 13

| Requirement | Recommended Module | Protocol Used | Reason |
|---|---|---|---|
| GPS Tracking | NEO-6M / SIM808 GPS Module | UART / I2C / SPI | Provides real-time location tracking for navigation. |
| Data Transfer to control unit | ESP32 / Raspberry Pi | UART / I2C | Sends GPS coordinates for path optimization. |

Table 13 represents the hardware and communication interfaces used to provide GPS-based navigation data to the autonomous water vehicle's control unit. It identifies the recommended GPS module 160, the communication protocols it supports, and how processed GPS information is transferred to the controller for navigation and path planning.

Figure 2A:
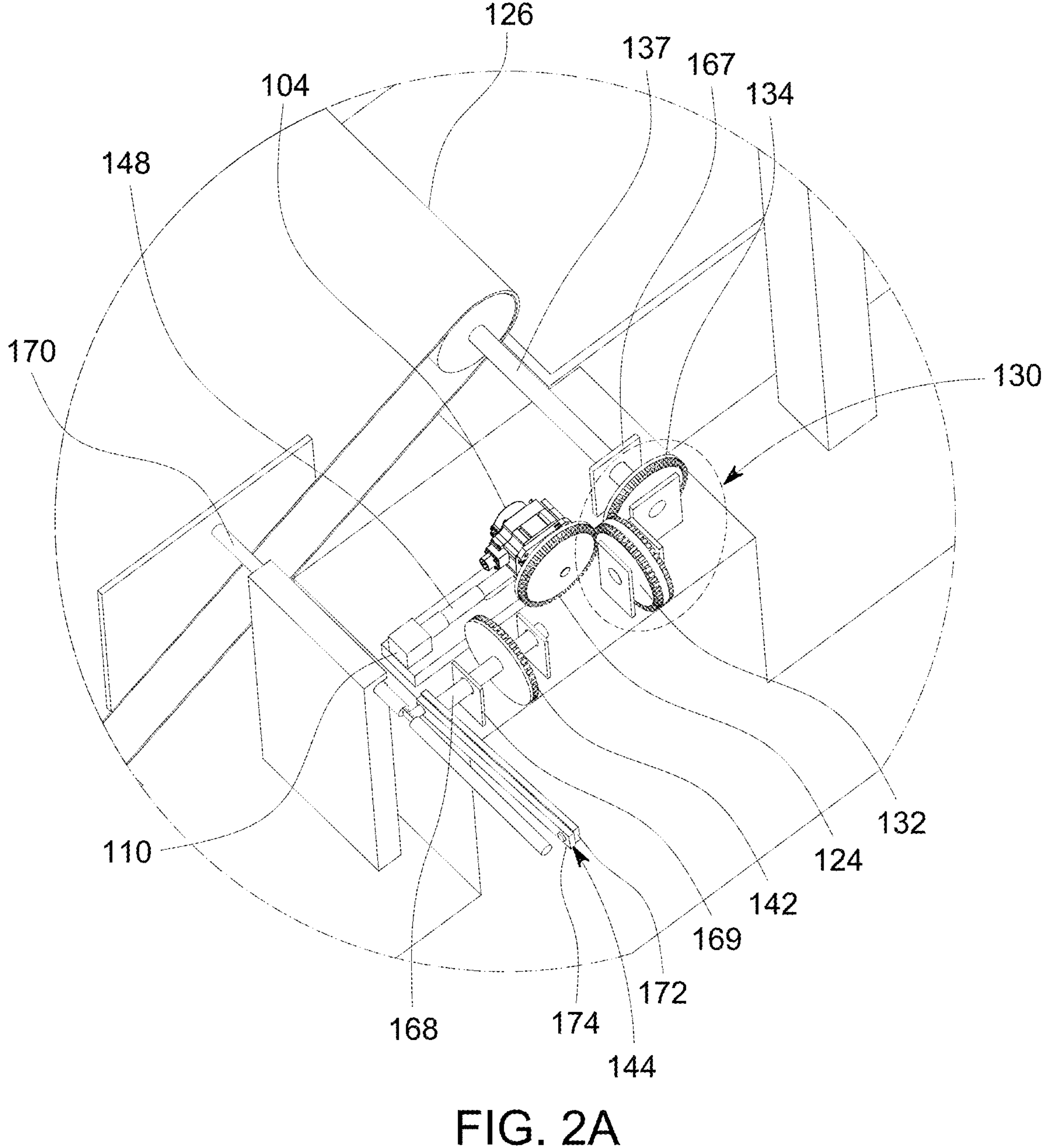
FIG. 2A illustrates an isometric view of a gear unit of the autonomous water vehicle, in accordance with of the invention.

FIG. 2A refers to an isometric view of the gear unit 130 of the autonomous water vehicle 100. In one embodiment herein, the gear unit 130 of the autonomous water vehicle 100 is a crucial mechanical assembly responsible for transmitting rotational motion to the conveyor unit 106. The gear unit 130 plays a significant role in ensuring the synchronized movement of the first support roller 126 and the second support roller 128, which drive the conveyor belt 138 for collecting floating waste. The gear unit 130 is strategically positioned to receive input power from the driving unit 104 and effectively distribute it to the first support roller 126 and the second support roller 128 of the conveyor unit 106.

In one embodiment herein, the gear unit 130 comprises the compound gear 132 and the driven gear 134. The compound gear 132 is a double-surfaced gear that engages with the drive gear 124, which is connected to the driving unit 104. This arrangement allows for a change in the direction of rotation, thereby ensuring efficient power transmission. The driven gear 134 is connected to the first support roller 126 via the first elongated shaft 137, thereby enabling the smooth transfer of rotational motion from the gear unit 130 to the conveyor belt 138.

Figure 2B:
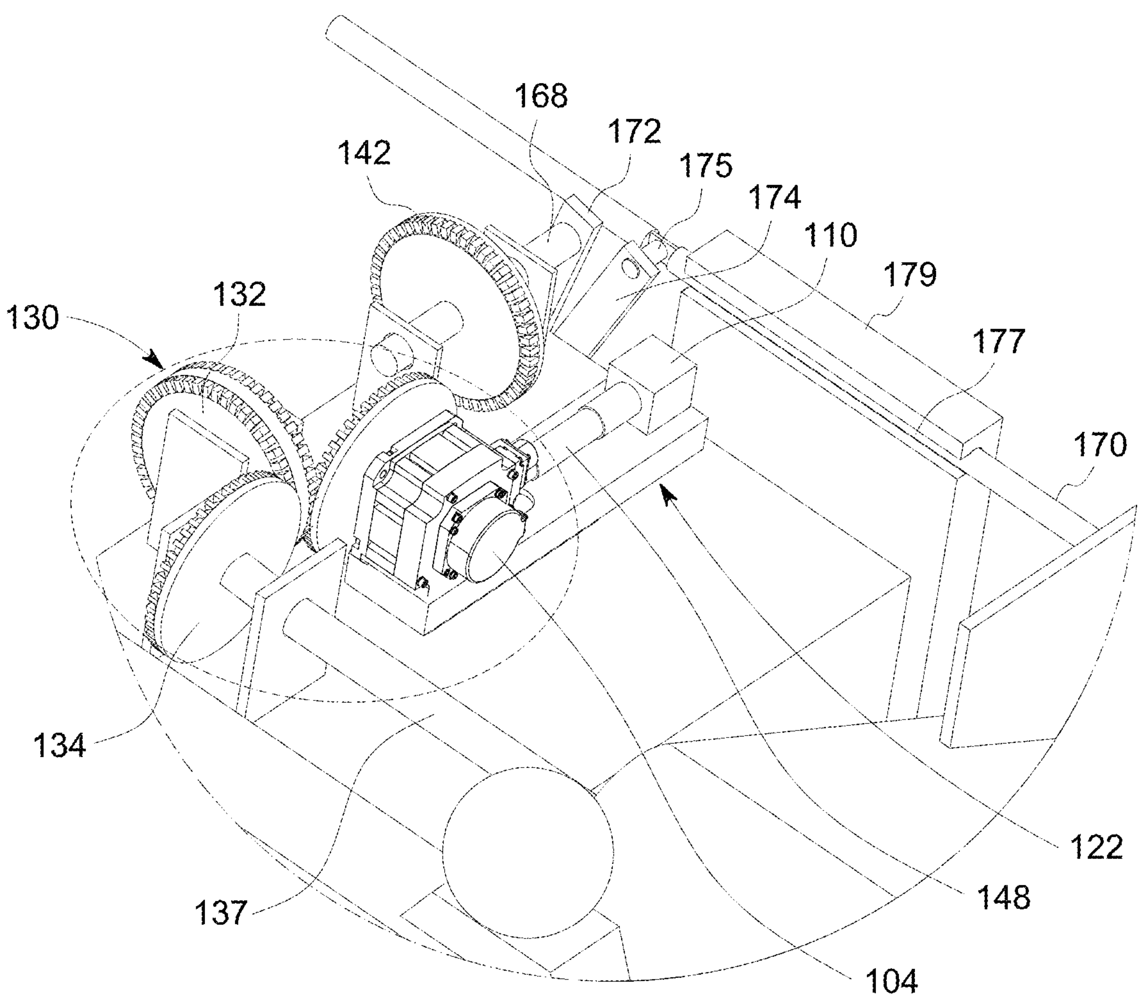
FIG. 2B illustrates an isometric view of the autonomous water vehicle when a drive gear engages with a compound gear, in accordance with of the invention.

FIG. 2B refers to an isometric view of the autonomous water vehicle 100 when the drive gear 124 engages with the compound gear 132. In one embodiment herein, the drive gear 124 receives power from the driving unit 104 and transmits it to the compound gear 132, thereby causing the compound gear 132 to rotate in the opposite direction. This motion is further transferred to the driven gear 134, which in turn drives the first support roller 126. As the first support roller 126 rotates, it moves the conveyor belt 138, thereby facilitating the continuous collection and transportation of waste materials from the water surface into the second storage chamber 140 of the autonomous water vehicle.

TABLE 14

| Subsystem | Parameter | Preferred Specification | Acceptable Range | Notes |
|---|---|---|---|---|
| Driving unit (conveyor/scraper shared) | Motor type | 24 V BLDC + planetary gearbox | 24 V brushed DC + planetary | BLDC = higher efficiency, sealed options common |
| | Continuous power | 120-150 W | 90-200 W | Sized for wet belt + scraper friction with margin |
| | Peak power (≤3 s) | 300-400 W | 250-500 W | For start-up/jam-clear with current limiting |
| | Gear ratio | 35:1-45:1 | 25:1-60:1 | Puts output in 40-80 rpm zone for small rollers |
| | Output speed (post-gear) | 50-90 rpm | 30-120 rpm | Maps to ~0.12-0.25 m/s belt for Ø70-100 mm rollers |
| | Output torque (cont.) | 10-15 Nm. | 8-20 Nm. | Covers algae scrape + wet debris lift |
| | Peak torque (≤3 s) | 25-30 Nm | 20-40 Nm | Brief surge; protect drivetrain with limits |
| | Supply/current | 24 V, 6-8 A cont.; 18-22 A peak | — | Fuse 30 A slow-blow; set driver peak ≈22-25 A |
| | Electromagnetic brake | 24 V, ≥2 Nm holding | 1-3 Nm | Holds belt during gear-shift/slopes |
| | Shaft/mount | Ø10 mm keyed; face-mount 63 mm class | Ø8-12 mm | Stainless/coated shaft; anti-corrosion hardware |
| | Protection | IP67 motor + gearbox | IP65-IP68 | Splash/brief immersion resistance |
| | Corrosion resistance | Anodized/epoxy housing, SS fasteners | — | Fresh/brackish water duty |
| | Operating temp | −10° C. to +60° C. | −20° C. to +70° C. | Outdoor range |
| Actuator (gear engagement) | Actuator type | 24 V DC micro-actuator, leadscrew (self-locking) | 12 V (with DC/DC) | Holds position power-off |
| | Stroke | 40 mm | 35-45 mm | Include ±3-5 mm over-travel each side for mesh |
| | Rated thrust | ≥300N | 250-500N | 2× safety over mesh/drag forces |
| | Speed (no-load/ at load) | 25-30 mm/s no-load; 10-20 mm/s @ ≥200N | 15-35 / 8-25 mm/s | Shift <3 s without gear slam |
| | Duty cycle | ≥25% @ full load | 20-40% | Short, infrequent moves |
| | Position sensing | Limit switches + Hall (or potentiometer) feedback | Limit only | MCU can verify position, retry if needed |
| | Supply/current | 24 V, 1.5-3 A cont.; ≤6 A peak | — | Size H-bridge for 10 A with current limit ~6 A |

TABLE 14-continued

| Subsystem | Parameter | Preferred Specification | Acceptable Range | Notes |
|---|---|---|---|---|
| | Back-drive | Self-locking (≤2 mm lead or nut brake) | — | Prevents drift under vibration |
| | End mounts | Double-clevis, 6 mm SS pins + rubber bushings | 5-8 mm pins | Tolerates minor misalignment, damps impact |
| | Side load rating | ≥50N | 30-80N | Protects screw/nut from off-axis load |
| | Protection | IP67 | IP65-IP68 | Sealed body + cable gland |
| | Operating temperature | −10° C. to +60° C. | −20° C. to +70° C. | Matches motor environment |
| | Actuator driver | Reversible H-bridge (PWM), current-limit, end-stop debounce | — | Simple ON→ move → limit workflow |

Table 14 represents the specifications of the driving unit 104 and actuator 110 employed in the autonomous water vehicle 100.

TABLE 15

| Pair | Driver → Driven | Teeth (z) | Diameter (mm) | Face width (mm) | Ratio |
|---|---|---|---|---|---|
| Drive gear → Bevel gear | $1^{st} \rightarrow 4^{th}$ | 18 → 16 | 25.0 → 22.5 | 8 | 1.125 |
| Drive gear → Compound gear | $1^{st} \rightarrow 2^{nd}$ | 18 → 32 | 25.0 → 42.5 | 8 | 0.562 |
| Compound gear → Driven gear | $2^{nd} \rightarrow 3^{rd}$ | 32 → 24 | 42.5 → 32.5 | 8 | 1.333 |

Table 15 represents the mechanical relationships between three bevel-gear pairs used in the autonomous water vehicle 100. Here, the gear train enables the driving unit 104 to operate two different mechanisms i.e., the conveyor unit 106 and the scraping unit by selectively engaging different bevel gears. When the drive gear 124 engages the compound gear 132 and the driven gear 134, the autonomous water vehicle 100 produces a reduced-speed, high-torque output suitable for driving the conveyor belt 138 to collect floating waste. When shifted to engage the bevel gear 142, the gear train delivers a higher-speed motion used to actuate the scraping member 108 for removing algae or organic waste from the conveyor belt 138. This dual-mode transmission allows smooth switching between waste collection and scraper operation, improving efficiency and reducing the need for separate motors.

FIG. 3 refers to a top view of the autonomous water vehicle 100. In one embodiment herein, the autonomous water vehicle 100 comprises the first encoder 180 and the second encoder 182. In one embodiment herein, the first encoder 180 is operably coupled to the driving unit 104. The first encoder 180 is configured to measure rotational displacement of the driving unit 104 for controlling conveyor movement and scraper actuation. The first encoder 180 provides real-time rotation feedback for controlling movement of the conveyor belt 138. The first encoder 180 is configured to generate high-resolution incremental pulses corresponding to the angular rotation of the driving unit 104. These pulses provide the control unit 116 with real-time rotational feedback, enabling closed-loop control of the motions performed by the conveyor belt 138 and the linear actuation unit 144.

During waste-collection mode, the first encoder 180 continuously monitors the rotational speed and angular position of the driving unit 104 to ensure smooth, consistent movement of the conveyor belt 138, precise alignment of waste with the first storage chamber 146, and detection of any abnormal load such as algae accumulation or belt resistance. During scraping mode, the first encoder 180 measures the exact number of rotations required to produce the forward and backward reciprocating motion of the scraping member 108 via the linear actuation unit 144, thereby ensuring accurate scraping cycles and preventing over-travel of the scraping member 108.

In one embodiment herein, the second encoder 182 is mounted on the extendable shaft 148. The second encoder 182 is configured to detect linear displacement of the actuator 110 for controlling gear engagement. The second encoder 182 generates incremental position data corresponding to the extension or retraction of the extendable shaft 148. This displacement data allows the control unit 116 to determine the instantaneous position of the driving unit 104 along the support member 122 and ensure that the driving unit 104 reaches its intended engagement position accurately for conveyor and scraper operations.

By tracking the linear displacement in real time, the second encoder 182 prevents over-extension of the extendable shaft 148, ensures smooth meshing of the bevel gears, and protects the mechanism from gear misalignment, tooth slippage, and mechanical overload. The control unit 116 is in communication with the first encoder 180 and the second encoder 182. The control unit 116 is configured to utilize data from the first encoder 180 and the second encoder 182 to regulate conveyor motion, scraping cycles and actuator travel. The first encoder 180 and the second encoder 182 receive the electrical power from the second power source 164.

The control unit 116 is in continuous communication with both the first encoder 180 and the second encoder 182. Using the real-time rotational feedback from the first encoder 180 and the linear displacement data from the second encoder 182, the control unit 116 implements closed-loop control strategies to regulate conveyor motion, scraper reciprocation cycles, and actuator travel. The control unit 116 uses the encoder signals to maintain consistent conveyor belt speed. The control unit 116 uses the encoder signals to precisely align detected data with the scraping member 108. The control unit 116 uses the encoder signals to determine scraper stroke length and timing. The control unit 116 uses the encoder signals to detect jams or abnormal resistance. The control unit 116 uses the encoder signals to ensure proper engagement and disengagement of bevel gears. The control unit 116 uses the encoder signals to return the system to its initial configuration after each scraping cycle.

FIG. 4A refers to an isometric view of the autonomous water vehicle 100 upon placing on water surface. In one embodiment herein, the autonomous water vehicle 100 is designed to operate independently in water bodies, efficiently detecting, classifying, and collecting floating waste and organic waste. The autonomous water vehicle 100 is operated upon placing the autonomous water vehicle 100 on the water surface. The autonomous water vehicle 100 is designed to remain stable, thereby preventing external disturbances such as waves or water currents from affecting its movement. Once in place, the control unit 116 activates the plurality of drive actuators 120, which in turn drive the plurality of propulsion wheels 118, thereby allowing the autonomous water vehicle 100 to navigate the water surface. The movement of the autonomous water vehicle 100 can be pre-programmed or dynamically adjusted based on real-time sensor data to ensure effective waste collection.

FIG. 4B illustrates an isometric view of the autonomous water vehicle upon activation of the driving unit 104. In one embodiment herein, the control unit 116 activates the driving unit 104, which in turn initiates the rotation of the drive gear 124. The compound gear 132 is designed with two meshing surfaces, where one surface engages with the drive gear 124, while the other surface meshes with the driven gear 134. This configuration ensures the smooth transfer of rotational motion. The first support roller 126 is rotatably connected to the driven gear 134 via the first elongated shaft 137, thereby allowing synchronized movement. As the first support roller 126 begins to rotate, it drives the second support roller 128 through the conveyor belt 138, thereby ensuring continuous and synchronized movement. This synchronized rotation facilitates the efficient collection of floating waste from the water surface, as the conveyor belt 138 effectively lifts and transports the waste towards the designated storage chambers.

FIG. 4C refers to an isometric view of the autonomous water vehicle 100 while collecting floating waste. As the autonomous water vehicle 100 moves, the first capturing unit 112 continuously scans the water surface for floating waste. Once waste is detected, the control unit 116 processes the information and initiates the classification process. The AI module 156 analyzes the floating waste using AI-based image processing to determine whether the waste is recyclable (such as plastic bottles or cans) or organic (such as leaves or food scraps or algae). This classification step is crucial as it allows the autonomous water vehicle 100 to segregate the waste effectively, thereby ensuring that different types of waste are handled appropriately.

TABLE 16

| Category | Data to train | Purpose |
|---|---|---|
| | Recyclable waste | |
| Plastic | Bottles, bags, straw | Direct plastic waste to recycling bin |
| Paper | Newspapers, cartoons, tissue paper | Identify paper waste for recycling |
| | Organic waste | |
| Algae | Green algae, blue-green algae, slime layers | Identify and activate scraping mechanism |
| | Non-waste elements | |
| Water | Clear water, waves | Avoid false detection |
| Reflections and shadows | Light reflections, dark areas | Reduce misclassification |

Table 16 represents how different types of training data are used to enable the AI module 156 to correctly identify and classify waste, avoid misclassifications (like mistaking water or reflections for waste), and trigger appropriate actions (such as activating the scraping mechanism for algae). The AI module's goal is to enhance sorting and handling of waste, ensuring the correct disposal methods are applied for different materials.

Once the classification is completed, the control unit 116 activates the conveyor unit 106 via the driving unit 104 to begin waste collection. The conveyor belt 138 transports the detected floating waste from the water surface towards the respective storage chambers. The first storage chamber 146 is used for storing organic waste such as algae, while the second storage chamber 140 holds recyclable waste. By implementing this structured waste management approach, the autonomous water vehicle 100 ensures that recyclable materials can be processed for reuse, while organic waste can be disposed of or repurposed accordingly.

FIG. 4D refers to an isometric view of the autonomous water vehicle 100 when the organic waste is present on the conveyor belt 138. FIG. 4E refers to an isometric view of the autonomous water vehicle 100 upon activation of the actuator 110. FIG. 4F refers to an isometric view of the autonomous water vehicle 100 while transferring the organic waste to the first storage chamber 146 using the scraping member 108. In addition to handling floating waste, the autonomous water vehicle 100 also detects and removes organic waste accumulation. The second capturing unit 114 monitors the conveyor belt 138 for organic waste.

If organic waste is detected, the control unit 116 activates the actuator 110, which moves the driving unit 104 along the support member 122 using the extendable shaft 148. The drive gear 124 disengages from the compound gear 132 and engages with the bevel gear 142, thereby linearly moving the scraping member 108 to push the organic waste into the first storage chamber 146. The control unit 116 then deactivates the actuator 110, causing the drive gear 124 to disengage from the bevel gear 142 and re-engage with the compound gear 132. This mechanism prevents organic waste buildup, thereby ensuring the smooth operation of the conveyor system.

To enhance operational efficiency, the control unit 116 continuously monitors the amount of detected floating waste and organic waste. Based on this data, it adjusts the speed of the autonomous water vehicle 100 by controlling the plurality of drive actuators 120 and plurality of propulsion wheels 118. If a high concentration of waste is detected in a specific area, the vehicle reduces its speed to allow thorough collection. In cleaner areas, the vehicle increases its speed to cover a larger surface area more efficiently. This adaptive speed control ensures that the autonomous water vehicle 100 prioritizes areas with high waste accumulation while maintaining an efficient cleaning process.

Overall, the autonomous water vehicle 100 is an advanced system designed to autonomously navigate water bodies, detect and classify floating waste and organic waste, and efficiently collect and store it. By integrating AI-based classification, automated waste collection, and adaptive navigation, the vehicle significantly enhances water cleaning operations. Its ability to dynamically adjust its movement and storage process makes it a sustainable and effective solution for maintaining cleaner aquatic environments while minimizing human intervention.

In one embodiment herein, the autonomous water vehicle 100 is designed to dynamically adjust its movement based on the detected waste in the water surface. The first capturing unit 112 plays a crucial role in identifying the location of floating waste and providing real-time feedback to the control unit 116, which subsequently regulates the navigation of the vehicle for optimal waste collection.

For instance, if the first capturing unit 112 detects floating waste on the right side of the autonomous water vehicle 100, it immediately transmits this detected image data to the control unit 116. Upon receiving this information, the control unit 116 processes the image data and determines the necessary adjustments to the vehicle's movement to ensure efficient waste collection. Specifically, the control unit 116 modifies the speed of the plurality of propulsion wheels 118 by controlling the plurality of drive actuators 120.

To steer the autonomous water vehicle 100 towards the detected waste on the right, the control unit 116 increases the speed of the left wheels while simultaneously reducing the speed of the right wheels. This difference in wheel speeds creates a turning motion that directs the autonomous water vehicle 100 toward the right. By executing this maneuver, the autonomous water vehicle 100 effectively repositions itself closer to the detected floating waste, thereby ensuring that the conveyor unit 106 can capture and collect the waste efficiently.

In one embodiment herein, the autonomous water vehicle 100 provides a chemical-free and eco-friendly approach by mechanically collecting floating waste without releasing harmful substances. Its portable and autonomous design makes it lightweight and easy to deploy, eliminating the need for manual intervention. Furthermore, the autonomous water vehicle 100 selectively removes only harmful organic waste, thereby ensuring that beneficial organic waste remain untouched, thus maintaining oxygen levels and preserving food sources for aquatic organisms.

In one embodiment herein, the autonomous water vehicle 100 ensures no negative impact on aquatic life by avoiding the use of harmful chemicals and operating with a soft collection mechanism that prevents physical harm to marine species. Additionally, its low-noise motors minimize vibrations and disturbances, further ensuring the safety of aquatic life. The autonomous water vehicle 100 allows for selective extraction of harmful organic waste, preventing oxygen depletion and maintaining ecological balance. Furthermore, the autonomous water vehicle 100 improves organic waste reduction, mosquito control, oxygen levels, and water clarity more effectively than chemical solutions, proving its superior efficiency and eco-friendly nature In one embodiment herein, the AI module 156 is configured to detect the floating waste with 360° monitoring. For example, a Raspberry Pi with OpenCV or TensorFlow Lite is utilized due to its AI-based image processing capability, which efficiently identifies floating waste. In one embodiment herein, the AI-based image processing refers to image analysis performed by a processor, for example, Raspberry Pi executing a stored neural-network model. The waste classification between recyclable and organic materials is achieved using Jetson Nano or Coral Edge TPU, thereby ensuring efficient real-time AI inference. To navigate and avoid obstacles, an Intel RealSense or LiDAR (RPLIDAR A1/A2) is incorporated, allowing the autonomous water vehicle 100 to adjust its path automatically for smooth operation. The processor is operably coupled to a non-transitory memory element, such as flash storage or embedded DDR memory, in which a trained neural-network model is stored. The neural-network model may include, but not limited to, a convolutional neural network (CNN), a single-shot object detector (SSD), a YOLO-based model, or another deep-learning architecture configured for real-time inference on aquatic waste images.

In one embodiment herein, the IoT communication module 166 is utilized for data transmission. The autonomous water vehicle 100 supports multiple communication modes based on distance requirements. For short-range communication (≤10 m), Bluetooth (HC-05/HM-10) is employed due to its low power consumption and suitability for app-based direct control. For mid-range communication (100 m-500 m), Wi-Fi (ESP32/ESP8266) is used to facilitate cloud connectivity, over-the-air (OTA) updates, and real-time data streaming. LoRa (RAK3172/SX1276) is incorporated for long-range communication, thereby offering low-power, wide-area connectivity in remote locations without internet access. Additionally, NB-IoT (SIM7000) or 4G LTE (SIM7600) ensures cellular connectivity for reliable continuous data transmission in areas without Wi-Fi.

In one embodiment herein, the autonomous water vehicle 100 utilizes the first capturing unit 112 and the second capturing unit 114, which includes, but not limited to, AI camera. In particular, the AI camera video streaming, Raspberry Pi Camera (OV5647, IMX219) or ArduCam is recommended, using CSI (Camera Serial Interface) or MIPI for high-speed video transfer. AI image processing is handled by Jetson Nano, Coral Edge TPU, or Raspberry Pi, using USB, SPI, or I2C for efficient communication. Processed AI data is transferred to the control unit 116 via ESP32 or a UART-to-USB Bridge (FTDI FT232RL) using UART, SPI, or I2C protocols to ensure seamless integration.

In one embodiment herein, DC propelling motors are controlled using a Motor Driver (L298N/BTS7960/VNH2SP30) through PWM and UART protocols to regulate speed and direction. The driving unit's motor, responsible for conveyor movement and organic waste scraping, employs Motor Drivers (L298N/TB6612FNG) and Servo/Stepper Drivers (PCA9685/A4988) with PWM, UART, and I2C communication. These modules enable smooth waste collection and organic waste removal operations.

In one embodiment herein, to facilitate real-time location tracking, the autonomous water vehicle 100 integrates a NEO-6M or SIM808 GPS module 160, thereby communicating via UART, I2C, or SPI. GPS data is transferred to the control unit 116 through ESP32 or Raspberry Pi using UART or 12C, optimizing the device's navigation path for efficient waste collection.

In one embodiment herein, the autonomous water vehicle 100 dimensions are 600 mm×400 mm×250 mm, ensuring compactness for smooth navigation in water bodies like lakes, ponds, and rivers. The floating body 102 is 600 mm×400 mm×200 mm, providing stability and buoyancy. The plurality of propulsion wheels 118 having a diameter of 80-100 mm enable smooth water movement. The waste collection conveyor measures 500 mm×200 mm, optimized for effective debris collection. The first support roller 126 and the second support roller 128 having (40-60 mm diameter) support waste transfer, while the conveyor belt 138 (3-5 mm thickness) ensures durability.

The scraping member 108 (200 mm×40 mm) effectively removes organic waste, and the first storage chamber 146 with 5 L (recyclables) and the second storage chamber 140 3 L (organic waste) facilitate proper segregation. The first link member 172 having a length of 65 mm, a width of 15 mm, a thickness of 5 mm, and includes a Ø6 mm hole. This first link member 172 helps define the stroke length while providing suitable inertia for stable motion. The second link member 174 having a length of 85 mm, a width of 15 mm, a thickness of 5 mm, and incorporates a 06 mm H9 hole fitted with bushes. This second link member 174 guides the scraping member 108 to maintain the proper angle and prevents chatter when operating under load.

In one embodiment herein, the first capturing unit 112, responsible for floating waste detection and navigation, is trained to detect plastic (bottles, bags, wrappers), paper (cartons, newspapers, cardboard, cups), organic waste (leaves, wood debris, algae), and water conditions (ripples, clean water, disturbed water). The first capturing unit 112 also identifies obstacles (walls, rocks, buoys, boats) and floating animals (fish, birds, amphibians) to prevent harm. The second capturing unit 114, responsible for waste classification and sorting, categorizes recyclable waste (plastic, paper), organic waste (algae, slime layers), and non-waste elements (clear water, reflections, shadows) to improve accuracy. The first capturing unit 112 employs YOLO (You Only Look Once) or MobileNetV2 for object detection and path planning, while the second capturing unit 114 utilizes TensorFlow Lite or Jetson Nano for deep-learning classification.

In one embodiment herein, the plurality of drive actuators 120 adjusts the speed of the plurality of propulsion wheels 118 to change direction based on waste position. If waste is directly ahead, both left and right wheels 118 run at 50 RPM to move straight. If waste is slightly right, the left wheels 118 maintain 50 RPM while the right wheels 118 runs slow to 30 RPM, creating a slight right turn. For sharp right turns, the left wheels 118 run at 70 RPM while the right 118 stop or reverse at −30 RPM. A similar mechanism applies for leftward movement. When an obstacle is detected, both left and right 118 reverses at −40 RPM to move backward.

In one embodiment herein, the scraping member 108 moves in a controlled manner based on detected organic waste presence. Initially, the scraping member 108 is stationary at 0 RPM. When organic waste is detected, the plurality of drive actuators 120 rotates at 30 RPM forward, extending the scraping member 108 for at least 50 mm for scraping. The scraping member 108 reaches a maximum extension of 200 mm at 120 RPM, ensuring effective organic waste removal. The scraping member 108 retracts 30 RPM in reverse until it returns to the original position. This cycle repeats for continuous organic waste clearance.

In one embodiment herein, the autonomous water vehicle 100 employs the actuator 110, which consuming 200 W, making it more energy-efficient than existing designs that use multiple motors, thereby consuming 250-300 W. This results in a 33.3% power reduction, calculated as:

$$\begin{aligned}\text{Power saved} &= \text{Power consumed by the traditional devices} - \\ &\quad\ \text{autonomous water vehicle 100} \\ &= 300\text{ W} - 200\text{ W} \\ &= 100\text{ W} \\ \text{Efficiency} &= (100/300) * 100 \\ &= 33.33\%\end{aligned}$$

The autonomous water vehicle 100 significantly reduces power consumption while maintaining performance. In one embodiment herein, the floating body 102 is constructed from High-Density Polyethylene (HDPE) or marine-grade aluminum, ensuring lightweight buoyancy and corrosion resistance. The plurality of propulsion wheels 118 are made from stainless steel with rubber coating, providing durability and grip on water surfaces. The waste collection conveyor is built from stainless steel or reinforced nylon, ensuring strength and non-corrosiveness.

The first support roller 126 is fabricated from stainless steel (304/316) or aluminum alloy, while the second support roller 128 uses reinforced nylon or polyurethane-coated aluminum to minimize friction. The scraping member 108 is crafted from 304 stainless steel or high-strength polymer, ensuring efficient organic waste removal. Lastly, bevel gears and the linear actuation unit 144 are composed of brass, hardened steel, or nylon composites for smooth motion and high durability.

In one example embodiment herein, the invention provides a method for operating the autonomous water vehicle 100. Initially, the user places the autonomous water vehicle 100 onto the surface of a water surface. The first power source 162 provides electrical power to the control unit 116 and the motors 120 throughout this process. The plurality of propulsion wheels 118 is driven by the plurality of drive actuators 120 under the control of the control unit 116. During operation, the first capturing unit 112, implemented as a 360-degree camera, continuously monitors the surrounding water surface. Upon detecting any floating waste, the first capturing unit 112 transmits the detection image data to the control unit 116.

The control unit 116 processes the received image data and initiates a classification procedure. The AI module 156, which communicates with the control unit 116, analyzes the detected waste using the AI-based image processing techniques to determine whether the waste is recyclable (such as plastic bottles or cans) or organic (such as leaves, food scraps, or algae). This classification step is essential for enabling effective segregation of waste, ensuring that each category is handled appropriately. The sensing unit 158 assists the control unit 116 in obstacle avoidance and course adjustment to ensure safe navigation.

After classification, the control unit 116 activates the plurality of drive actuators 120 to maneuver the autonomous water vehicle 100 toward the detected floating waste. The GPS module 160 supports this process by enabling real-time tracking and navigation toward the target location. Once the autonomous water vehicle 100 reaches the waste, the control unit 116 deactivates the motors 120. The control unit 116 then activates the driving unit 104 to rotate the drive gear 124 in a clockwise direction. The compound gear 132, configured as a double-surfaced bevel gear, is detachably engaged with the drive gear 124 and rotates in an anticlockwise direction in response.

One surface of the compound gear 132 engages the drive gear 124, while the opposite surface engages the driven gear 134. Rotation of the compound gear 132 drives the driven gear 134 in a clockwise direction. The driven gear 134 is rotatably connected to the first support roller 126 via the first elongated shaft 137, thereby enabling the first support roller 126 to rotate in a clockwise direction. The first support roller 126 is operatively connected to the second support roller 128 through the conveyor belt 138. As the first support roller 126 and the second support roller 128 rotate, the conveyor belt 138 moves from the second support roller 128 toward the first support roller 126, thereby collecting the floating waste.

The conveyor belt 138 includes the plurality of perforations 141 designed to drain water from the captured waste during collection. When the first capturing unit 112 identifies recyclable waste, such as plastic bottles or cans on the conveyor belt 138, then the first capturing unit 112 transmits this information to the control unit 116. The control unit 116 allows the conveyor belt 138 to continue moving, thereby transferring the recyclable waste into the second storage chamber 140. When the second capturing unit 114 detects organic waste, such as leaves, food scraps, or algae at a region of interest (ROI) on the conveyor belt 138, the second capturing unit 114 communicates this information to the control unit 116.

In response, the control unit 116 activates the actuator 110 to retract the extendable shaft 148, causing the driving unit 104 to slide from the first end to the second end along the support member 122. During this movement, the drive gear 124 disengages from the compound gear 132 and engages the bevel gear 142, thereby deactivating the conveyor unit 106. Upon engagement, the bevel gear 142 rotates in an anticlockwise direction as the drive gear 124 rotates clockwise. This rotation drives the first link member 172 via the supporting shaft 168. The movement of the first link member 172 actuates the second link member 174, which includes the projection 175 at its secondary end.

As the second link member 174 rotates, the projection 175 pushes the connecting column 170 along the guide slot 177 formed in the mounting member 179. The movement of the connecting column 170 causes the scraping member 108 to move perpendicularly relative to the conveyor belt 138. This motion dislodges and pushes the organic waste present on the conveyor belt 138 into the first storage chamber 146.

TABLE 17

| Configuration | Components Used | Avg Power STD | Peak Power (instant) | Notes |
|---|---|---|---|---|
| Autonomous water vehicle | Single motor + linear actuator | ≈75 W | ≈150 W | From updated Pack-2 budgets: 120 W motor at 60 duty + actuator/encoders (≈1-3 W). |
| Existing Devices | Two motors (conveyor + scraper) | ≈135 W | ≈300 W | Typical 150 W + 150 W motors; conveyor ~60% duty; scraper ~30%. |

Table 17 represents a significant reduction in power consumption when compared with existing dual-motor devices. The autonomous water vehicle 100 operates at approximately 75 W on average with peak demands near 150 W. Traditional systems using separate conveyor and scraper motors consume around 135 W on average and can reach 300 W under peak load. This translates to a 44.4% improvement in average power efficiency and nearly a 50% reduction in peak power draw for the autonomous water vehicle 100. Fewer components also result in reduced wear, simplified maintenance, and improved overall reliability.

TABLE 18

| | Water surface & condition | | | | | |
|---|---|---|---|---|---|---|
| | Urban lake, calm | Farm pond, heavy organic waste | Slow river reach | Irrigation canal, weeds | Brackish estuary | Retention basin (post-rain) |
| Flow (m/s) | 0.05 | ~0 | 0.3 | 0.15 | 0.1 | 0.05 |
| Turbidity NTU (Nephelometric Turbidity Units)/ Salinity ppt | 12/0.2 | 22/0.1 | 18/0.2 | 25/0.3 | 14/8.0 | 45/0.3 |
| Duration (min)/ Path (km) | 90/1.8 | 60/0.9 | 75/2.5 | 80/1.6 | 70/1.3 | 60/1.0 |
| Total collected (kg) [Plastics/Organic] | 1.9 [1.1/0.8] | 2.0 [0.4/1.6] | 2.4 [1.8/0.6] | 2.0 [0.9/1.1] | 1.7 [1.2/0.5] | 2.9 [1.6/1.3] |
| Bin dumps (Recyclables/Organic) | 45811 | 45901 | 45720 | 45840 | 45719 | 45872 |
| Scraper cycles (#/h) | 18 | 36 | 10 | 22 | 12 | 28 |
| Conveyor uptime (%) | 86 | 72 | 92 | 84 | 90 | 80 |
| Jams (handled/total) | 0/0 | 45690 | 45658 | 45719 | 0/0 | 45690 |
| Avg. Power Pack-1 W/Pack-2 W | 340/58 | 310/82 | 430/50 | 360/70 | 380/52 | 400/78 |
| Observed runtime (h) | 1.8 | 1.5 | 1.4 | 1.6 | 1.5 | 1.2 |

Table 18 represents field trials conducted across six different water bodies ranging from calm lakes to algae-heavy ponds and slow-moving rivers confirm the robustness of the proposed design. Conveyor uptime remained consistently high (72-92%), while scraper cycles adjusted automatically based on debris density (10-36 cycles per hour). Waste collection ranged from 1.7 to 2.9 kg per session, depending on environmental conditions. Power consumption for Pack-1 varied between 310-430 W, and Pack-2 between 50-82 W, with observed runtimes of 1.2-1.8 hours across the different sites. The autonomous water vehicle 100 effectively managed debris, organic matter, and occasional jams, demonstrating strong adaptability across varied aquatic environments.

Figure 5:
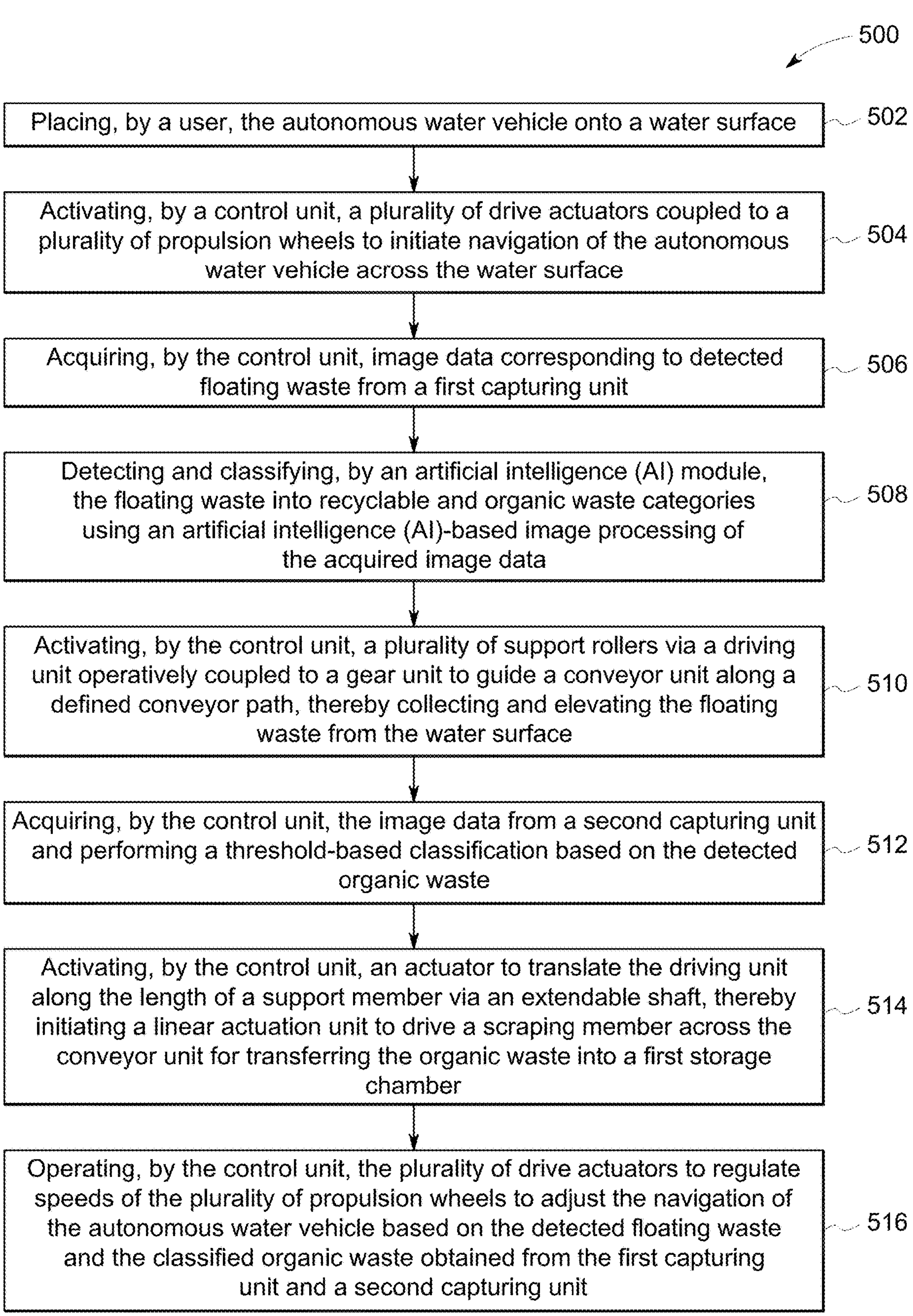
FIG. 5 illustrates a flowchart of a method for operating the autonomous water vehicle, in accordance with of the invention.

FIG. 5 refers to a flowchart 500 of a method for operating the autonomous water vehicle 100. At step 502, the user places the autonomous water vehicle 100 on the water surface. At step 504, the control unit 116 activates the plurality of drive actuators 120 coupled to the plurality of propulsion wheels 118 to initiate navigation of the autonomous water vehicle 100 across the water surface. At step 506, the control unit 116 acquires the image data corresponding to detected floating waste from the first capturing unit 112.

At step 508, the AI module 156 detects and classifies the floating waste into the recyclable and organic categories using the AI-based image processing of the acquired image data. At step 510, the control unit 116 activates the plurality of support rollers (126, 128) via the driving unit 104 operatively coupled to the gear unit 130 to guide the conveyor unit 106 along the defined conveyor path, thereby collecting and elevating the floating waste from the water surface. At step 512, the control unit 116 acquires the image data from the second capturing unit 114 and performs the threshold-based classification based on the detected organic waste.

At step 514, the control unit 116 activates the actuator 110 to translate the driving unit 104 along the length of the support member 122 via the extendable shaft 148, thereby initiating the linear actuation unit 144 to drive the scraping member 108 across the conveyor unit 106 for transferring the organic waste into the first storage chamber 146. At step 516, the control unit 116 operates the plurality of drive actuators 120 to regulate speeds of the plurality of propulsion wheels 118 to adjust the navigation of the autonomous water vehicle 100 based on the detected floating waste and the classified organic waste obtained from the first capturing unit 112 and the second capturing unit 114.

In one example embodiment herein, existing algae-cleaning and waste-collection devices suffer from several limitations that reduce their effectiveness and, in many cases, cause additional harm to aquatic ecosystems. Chemical-based algae cleaning systems rely heavily on toxic chemical agents to eliminate algae. These chemicals are often released directly into the water, where they can poison fish, reduce oxygen levels, and destabilize the broader ecological balance. A critical drawback of such systems is their inability to distinguish between harmful and beneficial algae; without an algae removal prediction mechanism, they indiscriminately remove all algae types. This indiscriminate removal disrupts the natural food chain and harms organisms such as zooplankton and fish that depend on beneficial algae for survival.

Similarly, bulky floating waste collection devices present practical and ecological challenges. Their large size and reliance on manual operation make them unsuitable for smaller or medium-sized water bodies, limiting their applicability. These devices are typically expensive to operate and maintain, making them impractical for widespread deployment. Furthermore, in the absence of an algae removal prediction system, these devices collect waste and algae indiscriminately, which not only reduces their operational efficiency but may also inadvertently disturb the ecological balance of the water surface they are intended to clean.

In contrast, the proposed autonomous water vehicle 100 overcomes these shortcomings through a chemical-free, fully mechanical design that does not release toxins into the environment. This environmentally friendly approach ensures the protection of aquatic life and supports long-term ecosystem health. The autonomous water vehicle 100 is compact, lightweight, and portable, enabling easy deployment across a wide range of water bodies, including small lakes, ponds, canals, and reservoirs. Its autonomous operation significantly reduces the need for manual oversight, improving operational convenience and efficiency.

Moreover, the integration of an AI-based algae removal prediction system allows the autonomous water vehicle 100 to selectively identify and remove only harmful organic waste species. This ensures that beneficial organic waste remain in the ecosystem, supporting oxygen production and maintaining essential food sources for aquatic organisms.

TABLE 19

| Metric | Chemical-Based Devices | Bulky Floating Devices | Autonomous water vehicle | Improvement |
|---|---|---|---|---|
| Harmful Chemical Release | Yes | No | No | 100% chemical-free |
| Autonomous Operation | No | No (Manual operation needed) | Yes | Fully autonomous |
| Organic Waste Removal Prediction | No | No | Yes | Selective organic waste removal |
| Device Size & Portability | Small | Bulky | Portable | Easy to deploy |
| Cost-Effectiveness | Cheap but damages ecosystem | Expensive | Affordable | Lower maintenance costs |
| Effect on Aquatic Life | Harm's fish & oxygen levels | Removes all algae | Protects beneficial algae | Ecosystem-friendly |

Table 19 represents compares three categories of water-cleaning technologies, chemical-based organic waste removal devices, bulky floating waste-collection systems, and the proposed autonomous water vehicle across several key performance metrics. It also highlights the improvements offered by the autonomous water vehicle over the existing solutions.

In one embodiment, the autonomous water vehicle 100 includes a counterweight 178 strategically positioned at the rear portion of the floating body 102. This counterweight functions to counterbalance the vehicle 100 during operation, particularly when the conveyor and scraping mechanism are actively collecting floating waste at the front end of the vehicle 100. As the front section experiences additional load due to accumulated waste, the counterweight 178 stabilizes the floating body 102, preventing excessive forward tilting, maintaining optimal buoyancy distribution, and ensuring smooth and uninterrupted collection performance. The counterweight 178 is formed from dense, heavy materials to provide the necessary mass for effective balancing without requiring excessive volume or space.

Unlike chemical-based algae removal methods, the autonomous water vehicle 100 mechanically collects floating waste including algae without introducing any toxic substances into the water. This ensures safe operation and prevents chemical contamination of the aquatic environment. The autonomous water vehicle 100 is specifically engineered to collect only floating waste from the water surface. Since most aquatic organisms reside below the surface, the autonomous water vehicle 100 operates without disturbing or harming fish, amphibians, or other marine species.

The autonomous water vehicle 100 intelligently distinguishes between harmful and beneficial organic waste. Only harmful organic waste is targeted and removed, while beneficial organic waste, which support oxygen production and serve as vital food sources remain undisturbed. This selective approach maintains ecological balance and prevents unintended disruption of the aquatic food chain. A controlled conveyor-based waste collection mechanism ensures gentle handling of captured materials. This soft-collection design minimizes the risk of harming small aquatic species that may come near the autonomous water vehicle 100 during operation. The use of BLDC and stepper motors reduces vibration and operational noise, ensuring minimal disturbance to aquatic life. The quiet operation allows the autonomous water vehicle 100 to function effectively without disrupting natural behaviors or causing stress to the ecosystem.

In one embodiment herein, chemical-based algae cleaning systems suffer from significant limitations, primarily due to their lack of mobility and inability to treat an entire water surface effectively. These systems typically operate in a fixed location, restricting organic waste removal to a limited area while leaving other regions untreated. This leads to uneven cleaning and allows harmful algal growth to persist in untreated zones. Furthermore, the absence of water movement contributes to stagnation, which promotes additional contamination. Stagnant water becomes a breeding ground for mosquitoes and insects, increasing the risk of waterborne diseases. Organic waste such as decaying leaves and dead plants also accumulates in stagnant zones, exacerbating water quality degradation and creating foul odors and harmful gas emissions.

The autonomous water vehicle 100 overcomes these limitations through enhanced mobility, intelligent sensing, and eco-friendly operation. Unlike fixed chemical systems, the autonomous water vehicle 100 actively moves across the water surface, ensuring uniform removal of organic waste and floating waste throughout the entire water surface. Its mobility generates natural water circulation, disrupting stagnant zones that commonly form in ponds, lakes, and reservoirs. This movement prevents the buildup of organic waste, organic debris, and harmful gases, while also improving dissolved oxygen levels.

By continuously circulating the water, the autonomous water vehicle 100 effectively eliminates stagnant pockets, significantly reducing mosquito breeding and insect infestation. This improvement in water flow directly contributes to better water hygiene and lowers the risk of mosquito-borne diseases such as malaria, dengue, and Zika virus-serious public-health concerns in stagnant water environments. The autonomous water vehicle's consistent motion also enhances oxygenation, contributing to a healthier aquatic ecosystem.

Environmentally, the autonomous water vehicle 100 employs a fully mechanical, chemical-free collection system, preventing harmful contamination associated with chemical treatments. In stagnant waters, organic waste typically sinks and decomposes, releasing gases such as methane and hydrogen sulfide. By continuously circulating water and collecting floating waste, the device prevents this buildup and maintains a cleaner ecosystem. Additionally, with its AI-based selective organic waste removal capability, the autonomous water vehicle 100 effectively removes harmful organic waste while preserving beneficial microorganisms essential for ecological balance.

TABLE 20

| Aspect | Chemical-Based Algae Removal | Autonomous water vehicle |
|---|---|---|
| pH Stability | Often causes pH fluctuations | Maintains natural PH levels |
| Typical pH Range | 6.0-9.5 (can vary widely) | 6.5-8.5 (natural range) |
| Impact on Aquatic Life | Harm fish, plants, microorganisms | Protects aquatic life |
| Ecosystem Balance | Disrupts natural balance | Preserves ecosystem balance |
| Long-Term Effects | Can cause chronic pH instability | No long-term pH changes |
| Chemical Contamination | Releases harmful chemicals | 100% chemical-free |

Table 20 represents a comparative analysis of pH impact and ecological safety between chemical-based algae removal systems and the autonomous water vehicle 100. It shows that chemical-based systems tend to disrupt water chemistry and harm aquatic ecosystems, whereas the autonomous water vehicle 100 maintains natural PH levels and operates without chemical contamination, making it environmentally safe and sustainable.

TABLE 21

| Algae Removal Method | | Quantity Used | pH Change | Time to Clear Organic Waste | Impact on Ecosystem |
|---|---|---|---|---|---|
| Chemical usage | Copper Sulfate ($CuSO_4$) | 50-100 grams | pH drops by 0.5-1.5 (more acidic) | 2-3 days | Toxic to fish, invertebrates, and beneficial algae. |
| | Sodium Carbonate Peroxide | 100-200 grams | pH increases by 0.5-1.5 (more alkaline) | 1-2 days | Can harm fish and plants due to high pH and hydrogen peroxide release. |
| | Diquat (Herbicide) | 10-20 ml | pH may increase slightly (0.2-0.5) | 3-5 days | Toxic to aquatic life, especially fish and invertebrates. |

TABLE 21-continued

| Algae Removal Method | | Quantity Used | pH Change | Time to Clear Organic Waste | Impact on Ecosystem |
|---|---|---|---|---|---|
| | Calcium Hypochlorite | 50-100 grams | pH increases by 0.5-1.0 (more alkaline) | 1-2 days | Harmful to fish, plants, and beneficial bacteria. |
| Autonomous water vehicle | No Chemicals (Mechanical collection) | — | No change | 1.5-2 days (depends on size of device) | No harm to aquatic life |

Table 21 represents comparison of different algae-removal methods, specifically contrasting common chemical-based treatments with the autonomous water vehicle's mechanical, chemical-free approach. It highlights how chemical methods can significantly disrupt water chemistry and damage ecosystems, whereas the autonomous water vehicle 100 provides a safe, non-toxic, and environmentally friendly alternative.

In one embodiment, a performance comparison is conducted between conventional chemical-based algae removal systems and the autonomous water vehicle 100 over the course of a single day, focusing on their effectiveness in cleaning a 100 $m^2$ pond containing approximately 70% algae coverage. This comparison evaluates parameters such as cleaning efficiency, ecological impact, pH stability, operational time, and overall safety to aquatic life, thereby providing a clear assessment of the advantages offered by the autonomous water vehicle 100 under identical environmental conditions.

TABLE 22

| Metric | Before Pickup | Chemical Systems (Stagnant Water) | Autonomous water vehicle (Active Water) | % Improvement (IoT vs. Chemical) |
|---|---|---|---|---|
| Algae Presence (%) | 0.7 | 50% (20% reduction in a day) | 40% (30% reduction in a day) | 20% better reduction |
| Mosquito Presence (per $m^2$) | 40 | 30 (25% reduction in a day) | 20 (50% reduction in a day) | 25% better reduction |
| Oxygen Levels (mg/L) | 5.0 mg/L | 5.5 mg/L (10% increase in a day) | 6.0 mg/L (20% increase in a day) | 10% better increase |
| Water Clarity (Turbidity) | 60 NTU | 50 NTU (16.7% improvement in a day) | 40 NTU (33.3% improvement in a day) | 16.6% better improvement |

Table 22 compares the performance of chemical-based algae removal systems and the autonomous water vehicle 100 (active water circulation) over a single day of operation in a pond with 70% algae coverage. Four key ecological and water-quality metrics are evaluated: algae presence, mosquito density, oxygen levels, and water clarity. Overall, the comparative data shows that the autonomous water vehicle 100 outperforms chemical systems across all key environmental metrics, offering better algae reduction, reduced mosquito breeding, higher dissolved oxygen levels, and greater improvement in water clarity. This demonstrates that the autonomous water vehicle 100 is a more effective, environmentally safe, and sustainable alternative to chemical-based algae removal.

In one embodiment herein, the autonomous water vehicle 100 further comprises an anti-clogging assembly configured to prevent the accumulation of algae, fibrous organic debris, and moisture-laden waste on the conveyor belt 138. The anti-clogging assembly includes at least one of a hydrophobic or low-adhesion conveyor surface coating, a vibration-inducing micro-actuator positioned underneath the conveyor path to periodically dislodge adhered biomass, a secondary wiper blade mounted proximal to the second support roller 128 for continuously scraping residual algae, and a reversible conveyor control mode in which the control unit 116 cyclically reverses conveyor belt's rotation for a short duration to break adhesion forces. This self-cleaning configuration ensures uninterrupted conveyor operation, reduces maintenance requirements, and prevents power consumption spikes associated with algae-induced drag.

In one embodiment herein, the control unit 116 further executes a trained artificial intelligence model configured to differentiate harmful algae species from beneficial algae and other floating organic matter. The AI module 156 utilizes a combination of convolutional neural networks, spectral pattern analysis, and temporal decision filtering to compute an algae-severity score that predicts the ecological impact of a detected algal mass. Based on this prediction, the control unit 116 selectively engages the scraping assembly 107 only when harmful algae are present, while permitting beneficial algae to remain in the aquatic environment. This selective removal mechanism provides a substantial ecological advantage over conventional devices that indiscriminately remove all algae.

In one embodiment herein, the first encoder 180 and second encoder 182 form a closed-loop feedback system enabling precise detection of mechanical load, conveyor resistance, and gear alignment during operation. The control unit 116 receives encoder pulse differentials and determines whether rotational resistance exceeds a predefined threshold indicative of algae clogging, roller blockage, or misalignment of the drive gear with either the compound gear 132 or bevel gear 142. Upon detecting such conditions, the control unit 116 performs a corrective action including halting motion, reversing the conveyor, re-issuing alignment commands to the actuator 110, or initiating the anti-clogging cycle. This closed-loop feedback architecture enhances operational reliability and reduces mechanical wear by preventing unintended gear grinding or excessive torque buildup.

In one embodiment herein, the driving unit 104 functions as a dual-mode mechanical transmission by linearly translating between two engagement positions along the support member 122. In a first position, the drive gear 124 engages the compound gear 132 to operate the conveyor unit 106 for floating waste collection. In a second position, the drive gear 124 disengages from the compound gear 132 and engages the bevel gear 142 to activate the scraping assembly 107 for organic-waste removal. This mechanical translation enables a single motor to power two distinct subsystems without requiring additional actuators, thereby significantly reducing overall power consumption, component count, and system complexity. The linear-shift transmission architecture provides a compact alternative to traditional multi-motor aquatic cleaning systems.

In one embodiment herein, the conveyor unit 106 and scraping assembly 107 are operated under predefined torque, speed, and force limits configured to prevent harm to small aquatic organisms. The conveyor belt 138 is driven at a controlled low-impact speed during initial capture, and the scraping member 108 utilizes rounded, non-abrasive edges to minimize shear forces. The control unit 116 dynamically adjusts these operational parameters when the sensing unit 158 detects the presence of fish, amphibians, or other aquatic life near the conveyor inlet. This soft-collection mechanism ensures environmentally responsible waste removal, distinguishing the system from aggressive mechanical or chemical alternatives.

In one embodiment herein, the IoT communication module 166 supports cloud-based data transmission enabling remote diagnostics, historical data logging of waste-collection patterns, firmware over-the-air (OTA) updates, and predictive maintenance analytics. The control unit 116 periodically uploads operational telemetry such as waste-type distribution, motor load profiles, GPS-based coverage maps, encoder-derived duty cycles, and water-quality indicators to a remote server accessible through the user device 152. This cloud connectivity enables long-term performance optimization and coordinated multi-vehicle deployment.

The autonomous water vehicle 100 described herein is further applicable across a diverse range of environments beyond natural freshwater lakes and rivers. Its modular mechanical architecture, AI-driven waste classification, and dual-mode conveyor-scraping mechanism enable deployment in industrial wastewater lagoons, aquaculture farms, irrigation reservoirs, hydropower plant intake zones, urban stormwater retention ponds, marinas, flood-affected regions, municipal drinking-water reservoirs, floating solar installations, and environmental research sites. In such applications, the autonomous water vehicle provides continuous chemical-free removal of floating waste, prevention of water stagnation, selective elimination of harmful organic matter, and maintenance of optimal water-flow conditions. These features significantly reduce operational costs, improve ecological stability, and support long-term sustainability across a wide spectrum of water-management infrastructures.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The invention claimed is:

1. An autonomous water vehicle, comprising:

a floating body configured to provide buoyancy, stability, and structural support on a water surface, wherein the floating body is adapted to operably support a plurality of propulsion wheels configured to generate directional translational movement of the autonomous water vehicle across the water surface;

a driving unit movably mounted on a support member affixed to the floating body, wherein the driving unit is configured to operably connect to an actuator through an extendable shaft, wherein the driving unit is configured to be activated to rotate a drive gear, wherein the actuator is configured to extend or retract the extendable shaft to linearly translate the driving unit along the support member between a first position and a second position;

a conveyor unit inclinedly mounted on a plurality of support rollers, wherein the conveyor unit is configured to collect and elevate floating waste from the water surface upon actuation while the autonomous water vehicle maneuvers across the water surface, wherein the plurality of support rollers is rotatably mounted on respective elongated shafts secured to the floating body and to a pair of extended columns, wherein the plurality of support rollers comprises:

a first support roller rotatably connected to the drive gear via a gear unit, wherein the gear unit comprises:

a compound gear operably connected to the drive gear, wherein the compound gear is a double-surfaced bevel gear; and a driven gear rotatably connected to the first support roller via a first elongated shaft, wherein the driven gear is configured to be rotated upon rotation of the compound gear; and a second support roller rotatably mounted on the pair of extended columns, wherein the second support roller is configured to be rotated upon rotation of the first support roller via a conveyor belt;

a scraping assembly operably positioned on the floating body, wherein the scraping assembly is configured to perform a sorting operation for separating organic waste from the floating waste upon detection during a cleaning process, wherein the scraping assembly comprises:

a scraping member movably positioned relative to the conveyor belt;

a linear actuation unit mounted on the floating body, wherein the linear actuation unit is operably connected to the scraping member, and is configured to operably couple to the driving unit through a bevel gear when the driving unit is translated toward the linear actuation unit from the first position to the second position along the support member, wherein the bevel gear is rotatably supported by a supporting shaft and second supporting brackets, wherein the bevel gear is operably connected to the drive gear when the driving unit is at the second position such that the drive gear disengages from the compound gear of the gear unit and engages with the bevel gear, wherein activation of the linear actuation unit drives the scraping member in a linear reciprocating direction across the conveyor unit to push the organic waste from the conveyor belt into a first storage chamber mounted on the floating body, thereby performing the sorting operation;

a first capturing unit mounted on a support frame affixed to the floating body, wherein the first capturing unit is configured to capture images of the water surface and detect the floating waste on the water surface;

a second capturing unit mounted on the support frame, wherein the second capturing unit is configured to detect the organic waste present on the conveyor belt during the cleaning process; and a control unit operably disposed on the floating body, wherein the control unit is configured to communicate with the driving unit, the plurality of propulsion wheels, and the actuator, wherein the control unit is configured to:

acquire image data from the first capturing unit and the second capturing unit, respectively, process the image data and perform threshold-based classification to classify the floating waste as recyclable waste or the organic waste, and selectively actuate the actuator to translate the driving unit to linearly reposition from the first position to the second position, or from the second position to the first position, for operating either the conveyor unit to initiate the cleaning process when the drive gear engages the compound gear at the first position, or the linear actuation unit to drive the scraping member across the conveyor belt for transferring the organic waste into the first storage chamber when the drive gear engages the bevel gear at the second position.

2. The autonomous water vehicle of claim 1, wherein the control unit is further configured to communicate with a user device through a network, thereby enabling remote activation, status retrieval, and real-time monitoring of the cleaning process including waste detection events, conveyor unit activity, the sorting operation, and positional movement of the autonomous water vehicle during the cleaning process.

3. The autonomous water vehicle of claim 1, wherein each of the plurality of propulsion wheels is operatively coupled to a respective drive actuator and configured to impart torque to a corresponding propulsion wheel of the plurality of propulsion wheels, thereby maneuvering the autonomous water vehicle across the water surface, and wherein selective variation of a rotational speed and a rotational direction of the plurality of propulsion wheels provides asymmetric thrust distributions, thereby enabling forward propulsion, reverse propulsion, directional turning, and pivot-type maneuvering of the autonomous water vehicle.

4. The autonomous water vehicle of claim 1, wherein the conveyor belt has a plurality of perforations defined across a surface of the conveyor belt to permit drainage of water while retaining and transporting the floating waste collected from the water surface, and wherein the plurality of perforations is dimensioned and spatially distributed across the conveyor belt to permit water discharge through the conveyor belt while retaining the floating waste on the conveyor belt.

5. The autonomous water vehicle of claim 1, wherein the autonomous water vehicle further comprises a second storage chamber disposed on the floating body, wherein the second storage chamber is configured to receive the recyclable waste, and wherein the conveyor belt is controllably operated to transport and discharge segregated recyclable waste into the second storage chamber during the cleaning operation.

6. The autonomous water vehicle of claim 4, wherein the conveyor belt is made of a corrosion-resistant mesh material to prevent clogging while allowing drainage of water through the plurality of perforations.

7. The autonomous water vehicle of claim 2, wherein the autonomous water vehicle is in communication with the network via an Internet of Things (IoT) communication module.

8. The autonomous water vehicle of claim 1, wherein the bevel gear is configured to be operably connected to the drive gear when the driving unit is at the second position, wherein the bevel gear is configured to be rotated to enable the linear actuation unit to drive the scraping member in the linear reciprocating direction across the conveyor belt for performing the sorting operation.

9. The autonomous water vehicle of claim 1, wherein the linear actuation unit comprises:

a first link member rotatably connected to the bevel gear via the supporting shaft; and a second link member pivotably connected to the first link member, wherein the second link member is configured to be actuated upon rotation of the first link member, thereby enabling the scraping member to push the organic waste from the conveyor unit into the first storage chamber mounted on the floating body, thereby performing the sorting operation.

10. The autonomous water vehicle of claim 1, wherein the autonomous water vehicle comprises:

an artificial intelligence (AI) module in communication with the first capturing unit, wherein the AI module is configured to receive the image data from the first capturing unit and process the image data, thereby classifying the image data into recyclable and organic categories using AI-based image processing, wherein the AI module comprises a processor and a non-transitory memory storing a trained neural-network model, wherein the processor is configured to execute the trained neural-network model on the image data to generate classification outputs; and a sensing unit configured to detect obstacles while maneuvering the autonomous water vehicle across the water surface and transmit obstacle detection data to the control unit for initiating an adjustment to the autonomous water vehicle's path.

11. The autonomous water vehicle of claim 1, wherein the autonomous water vehicle comprises:

a global positioning system (GPS) module configured to perform real-time tracking of the autonomous water vehicle and transmit tracking data to the control unit for autonomous path determination and guidance.

12. The autonomous water vehicle of claim 1, wherein the first capturing unit is a 360-degree rotatable artificial intelligence (AI) camera.

13. The autonomous water vehicle of claim 1, wherein the second capturing unit is an artificial intelligence (AI) camera.

14. The autonomous water vehicle of claim 3, wherein the autonomous water vehicle comprises:

a first power source configured to supply electrical power to the control unit and the respective drive actuator of each of the plurality of propulsion wheels; and a second power source configured to supply electrical power to the driving unit and the actuator.

15. The autonomous water vehicle of claim 1, wherein the plurality of support rollers is rotationally driven by the driving unit through the corresponding elongated shaft via the gear unit, thereby imparting rotational support and guided movement of the conveyor unit along a conveying path.

* * * * *